(12) United States Patent
Han et al.

(10) Patent No.: US 12,190,764 B2
(45) Date of Patent: Jan. 7, 2025

(54) ELECTRONIC DEVICE AND METHOD FOR DISPLAYING SCREEN THROUGH FLEXIBLE DISPLAY

(71) Applicant: SAMSUNG ELECTRONICS CO., LTD., Suwon-si (KR)

(72) Inventors: Byeungwoong Han, Suwon-si (KR); Seungeun Lee, Suwon-si (KR); Woojin Kim, Suwon-si (KR); Taihoon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/311,549

(22) Filed: May 3, 2023

(65) Prior Publication Data
US 2024/0038112 A1    Feb. 1, 2024

Related U.S. Application Data

(63) Continuation of application No. PCT/KR2023/005579, filed on Apr. 24, 2023.

(30) Foreign Application Priority Data

Jul. 27, 2022  (KR) .................. 10-2022-0093090
Aug. 17, 2022  (KR) .................. 10-2022-0102733

(51) Int. Cl.
  *G09G 3/00*      (2006.01)
  *G06F 3/04886*   (2022.01)

(52) U.S. Cl.
  CPC ......... *G09G 3/035* (2020.08); *G06F 3/04886* (2013.01); *G06F 2203/04803* (2013.01);
  (Continued)

(58) Field of Classification Search
  CPC .............. G09G 3/035; G09G 2320/08; G09G 2340/0464; G09G 2340/12; G09G 2354/00; G06F 3/04886; G06F 2203/04803
  See application file for complete search history.

(56) References Cited

U.S. PATENT DOCUMENTS

| 10,073,668 B2 | 9/2018 | Chun et al. |
| 11,036,257 B2 | 6/2021 | Kim et al. |

(Continued)

FOREIGN PATENT DOCUMENTS

| EP | 2998851 | 4/2019 |
| KR | 20200043578 A | 4/2020 |

(Continued)

OTHER PUBLICATIONS

Search Report and Written Opinion dated Aug. 11, 2023 issued in International Patent Application No. PCT/KR2023/005579.

*Primary Examiner* — Peter D Mcloone
(74) *Attorney, Agent, or Firm* — NIXON & VANDERHYE P.C.

(57) ABSTRACT

According to an embodiment, an electronic device includes: a flexible display, at least one sensor, and a processor; wherein the processor is configured to: control the display to display an object at least partially superimposed on a first user interface displayed on the first display area and the second display area, on a portion of an edge of the first display area; identify that the state of the electronic device is changed from a second state to a first state, while the object is displayed on the portion of the edge of the first display area; display the object the portion of the edge of the second display area extending from the edge of the first display area, in response to identifying that the state of the electronic device is changed from the second state to the first state.

20 Claims, 16 Drawing Sheets

(52) U.S. Cl.
CPC .  *G09G 2320/08* (2013.01); *G09G 2340/0464* (2013.01); *G09G 2340/12* (2013.01); *G09G 2354/00* (2013.01)

(56) References Cited

U.S. PATENT DOCUMENTS

| | | |
|---|---|---|
| 11,042,284 B2 | 6/2021 | Lee et al. |
| 11,081,090 B2 | 8/2021 | Heo et al. |
| 11,228,669 B2 | 1/2022 | Jang et al. |
| 11,687,350 B2 | 6/2023 | Min et al. |
| 11,989,484 B2* | 5/2024 | Moon ................. G06F 3/01 |
| 2020/0333932 A1* | 10/2020 | Lee ................. G06F 3/04817 |
| 2022/0066724 A1* | 3/2022 | Moon ................. G06F 3/04886 |
| 2022/0113767 A1 | 4/2022 | Jung et al. |
| 2023/0122806 A1 | 4/2023 | Moon et al. |
| 2023/0146478 A1 | 5/2023 | You et al. |

FOREIGN PATENT DOCUMENTS

| | | |
|---|---|---|
| KR | 20200086830 A | 7/2020 |
| KR | 10-2020-0122725 | 10/2020 |
| KR | 10-2020-0132008 | 11/2020 |
| KR | 10-2021-0101684 | 8/2021 |
| KR | 102293094 B1 | 8/2021 |
| KR | 20220017203 A | 2/2022 |
| KR | 20220058185 A | 5/2022 |
| KR | 10-2518362 | 4/2023 |
| KR | 10-2537922 | 5/2023 |
| KR | 10-2574183 | 9/2023 |
| WO | 2022/031049 | 2/2022 |

\* cited by examiner

ELECTRONIC DEVICE AND METHOD FOR DISPLAYING SCREEN THROUGH FLEXIBLE DISPLAY

CROSS-REFERENCE TO RELATED APPLICATIONS

This application is a continuation of International Application No. PCT/KR2023/005579 designating the United States, filed on Apr. 24, 2023, in the Korean Intellectual Property Receiving Office and claiming priority to Korean Patent Application No. 10-2022-0093090, filed on Jul. 27, 2022, in the Korean Intellectual Property Office, and to Korean Patent Application No. 10-2022-0102733, filed on Aug. 17, 2022, in the Korean Intellectual Property Office, the disclosures of all of which are incorporated by reference herein in their entireties.

BACKGROUND

Field

The disclosure relates to an electronic device and method for displaying a screen through a flexible display.

Description of Related Art

As technology develops, an electronic device including a flexible display is being developed. For example, the flexible display included in the electronic device may be foldable. The electronic device may display a screen divided based on a folding axis.

SUMMARY

According to an example embodiment, an electronic device may comprise: a flexible display including first display area and second display area extending from the first display area based on a folding axis, at least one sensor, and a processor operably coupled to the flexible display and the at least one sensor. The processor may be configured to while a state of the electronic device is a second state, wherein a first state is a state in which an angle between a first direction which the first display area faces, and a second direction which the second display area faces is within a reference range and the second state is a state in which the first direction and the second direction are parallel, display an object at least partially superimposed on a first user interface displayed on the first display area and the second display area, on a portion of an edge of the first display area perpendicular to the folding axis. The object may be used for displaying a second user interface. The processor may be configured to during the object being displayed on the portion of the edge of the first display area, identify that the state of the electronic device is changed to the first state from the second state. The processor may be configured to in response to identifying that the state of the electronic device is changed to the first state from the second state, display the object on a portion of an edge of the second display area extending from the edge of the first display area.

According to an example embodiment, a method of operating an electronic device may comprise while a state of the electronic device is a second state, wherein a first state is a state in which an angle between a first direction which the first display area of a flexible display of the electronic device faces, and a second direction which second display area of the flexible display extending from first display area faces is within a reference range and the second state is a state in which the first direction and second direction are parallel, displaying an object at least partially superimposed on a first user interface displayed on the first display area and the second display area, on a portion of an edge of the first display area perpendicular to the folding axis, wherein the object may include operation used for displaying a second user interface. The method may comprise during the object being displayed on the portion of the edge of the first display area, identifying that the state of the electronic device is changed to the first state from the second state. The method may comprise in response to identifying that the state of the electronic device is changed to the first state from the second state, displaying the object on a portion of an edge of the second display area extending from the edge of the first display area.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
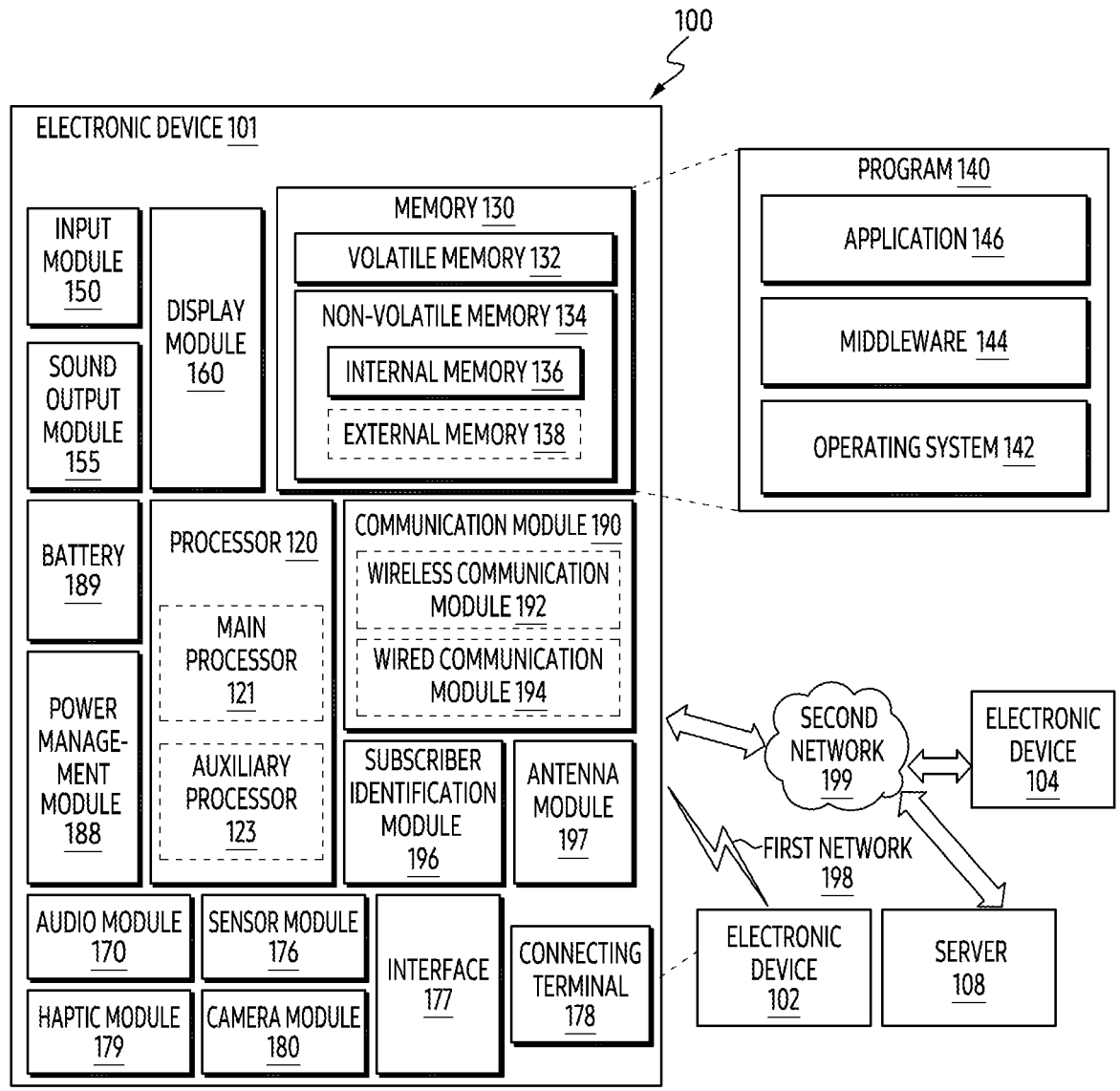
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
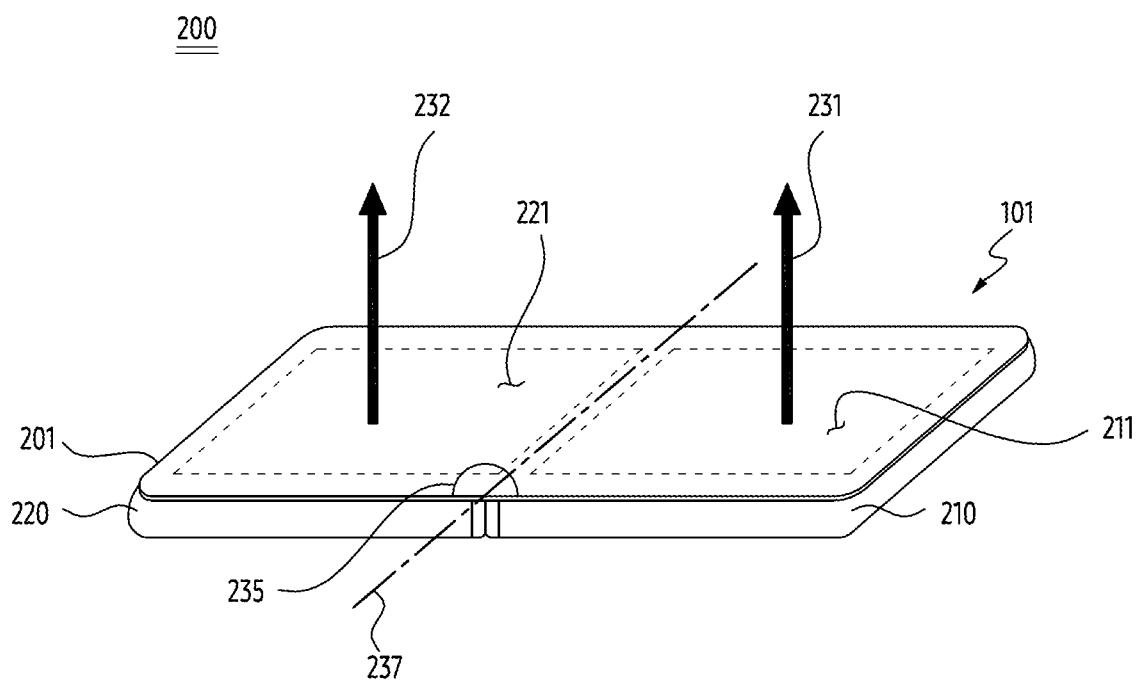
FIG. 2A is a diagram illustrating an example of a positional relationship between a first housing and a second housing in an unfolded state of an electronic device according to various embodiments.

FIG. 2A is a diagram illustrating an example of a positional relationship between a first housing and a second housing in an unfolded state of an electronic device according to various embodiments.

Figure 2B:
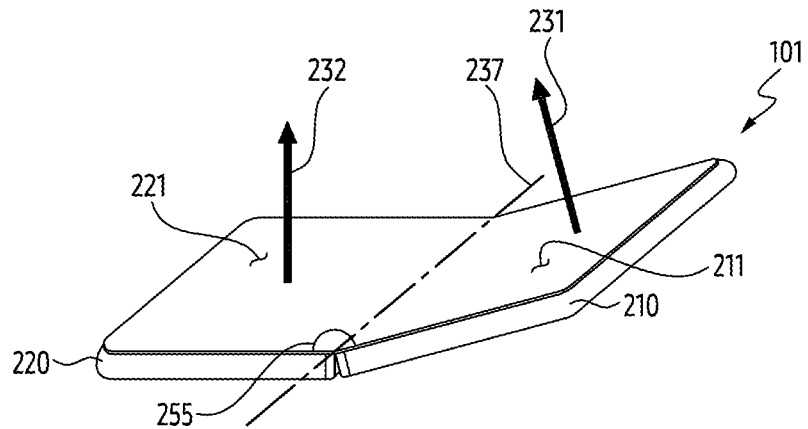
FIG. 2B is a diagram illustrating an example of positional relationships between a first housing and a second housing in various folded states of an electronic device according to various embodiments.
Figure 2B:
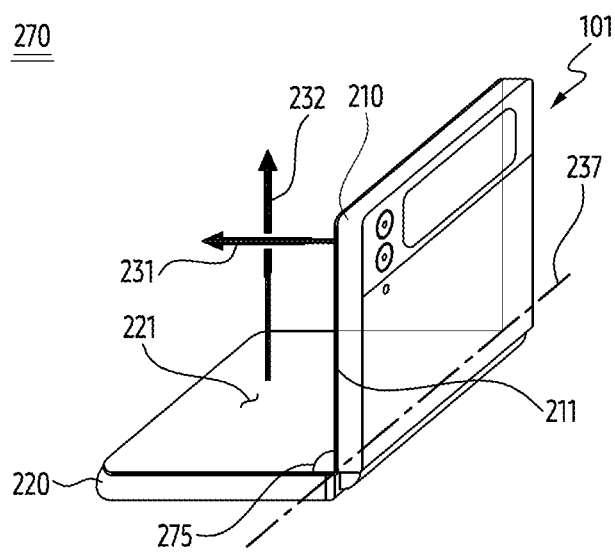
Figure 2B:
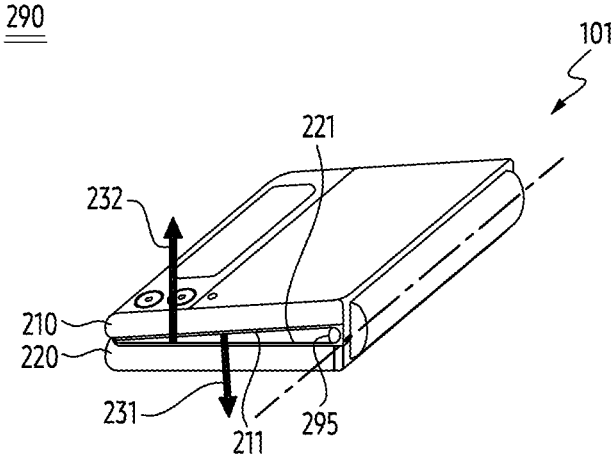

FIG. 2B is a diagram illustrating examples of various positional relationships between a first housing and a second housing in various folded states of an electronic device according to various embodiments.

Referring to FIGS. 2A and 2B, an electronic device 101 may include a first housing 210 and a second housing 220. The electronic device 101 may be folded such that the first housing 210 and the second housing 220 overlap or superimpose each other. The electronic device 101 may include a hinge structure for configuring the first housing 210 and the second housing 220 to be folded based on a folding axis 237. For example, the folding axis 237 may refer, for example, to a reference for folding the electronic device 101.

According to an embodiment, a display 201 of the electronic device 101 may be configured with a flexible display. For example, the display 201 may include a first display area 211 and a second display area 221. The second display area 221 may be adjacent to the first display area 211 along the folding axis 237. Although not illustrated, another display (not illustrated) for providing a third display area (not illustrated) facing the first display area 211 may be further included in the first housing 210.

Referring to FIG. 2A, the electronic device 101 may provide an unfolded state in which the first housing 210 and the second housing 220 are fully folded out. For example, the electronic device 101 may be in a state 200 in the unfolded state. In an embodiment, the unfolded state may be referred to as an outspread state or an outspreading state.

According to an embodiment, the state 200 may refer, for example, to a state in which a first direction 231 which the first display area 211 faces toward corresponds to a second direction 232 which the second display area 221 faces toward. For example, the first direction 231 may be parallel to the second direction 232. For example, the first direction 231 may be the same as the second direction 232.

According to an embodiment, in a state 200, the first display area 211 and the second display area 221 may substantially form one flat surface. For example, an angle 235 between the first display area 211 and the second display area 221 may be 180 degrees.

Referring to FIG. 2B, the electronic device 101 may provide a folded state in which the first housing 210 and the second housing 220 are folded in. For example, the electronic device 101 may be in a folded state including a state 250, a state 270, and a state 290. In an embodiment, the folded state may be referred to as a folded state.

According to an embodiment, the folded state including the state 250, the state 270, and the state 290 may refer, for example, to a state in which the first direction 231 which the first display area 201 faces toward is distinguished from the second direction 232 which the second display area 221 faces toward. For example, an angle between the first direction 231 and the second direction 232 may be greater than 0 degree and less than or equal to 180 degrees. For example, an angle between the first display area 211 and the second display area 221 may be greater than 0 degree and less than or equal to 180 degrees.

For example, in a state 250, the angle between the first direction 231 and the second direction 232 may be 45 degrees. In the state 250, an angle 255 between the first display area 211 and the second display area 221 may be 135 degrees.

For example, in a state 270, the angle between the first direction 231 and the second direction 232 may be 90 degrees. In the state 270, an angle 275 between the first display area 211 and the second display area 221 may be 90 degrees.

For example, in a state 290, the angle between the first direction 231 and the second direction 232 may be 180 degrees. In the state 290, an angle 295 between the first display area 211 and the second display area 221 may be 0 degree.

Figure 3:
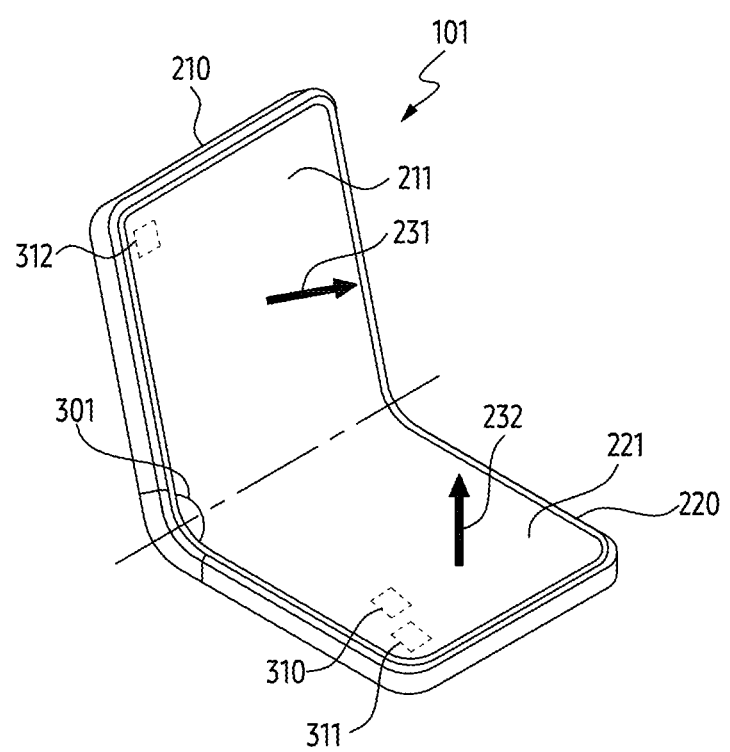
FIG. 3 is a diagram illustrating an example of a partially folded state of an electronic device according to various embodiments.

FIG. 3 is a diagram illustrating an example of a partially folded state of an electronic device according to various embodiments.

Referring to FIG. 3, the electronic device 101 may provide a plurality of states based on the positional relationship of the first housing 210 and the second housing 220. For example, the electronic device 101 may provide a plurality of states based on an angle 301 between the first display area 211 and the second display area 221. For example, the electronic device 101 may provide a plurality of states based on the angle between the first direction 231 which the first display area 211 faces toward and the second direction 232 which the second display area 221 faces toward.

According to an embodiment, the electronic device 101 may identify the angle 301 between the first display area 211 and the second display area 221. For example, the electronic device 101 may include a hall sensor 310 for identifying the angle 301. The electronic device 101 may include at least one magnet. The hall sensor 310 included in the electronic device 101 may obtain data on a magnetic field generated by at least one magnet. The electronic device 101 may identify the angle 301 between the first display area 211 and the second display area 221 based on the data on the magnetic field obtained using the hall sensor 310.

According to an embodiment, the hall sensor 310 may be disposed within the second housing 220. A first magnet 311 may be disposed within the second housing 220. A second magnet 312 may be disposed at a position corresponding to the position of the first magnet 311 within the first housing 210. For example, the first magnet 311 may be disposed along one of the edges of the second housing 220. The second magnet 312 may be disposed at a position corresponding to the position of the first magnet 311 along one of the edges of the first housing 210. For example, the first magnet 311 may be disposed within one of the corner areas of the second housing 220. The second magnet 312 may be disposed to correspond to the position of the first magnet 311 within one of the corner areas of the first housing 210. FIG. 3 illustrates an example in which the hall sensor 310, the first magnet 311, and the second magnet 312 are disposed within the electronic device 101, but is not limited thereto. The hall sensor 310, the first magnet 311, and the second magnet 312 may be variously disposed to identify the angle 301 between the first display area 211 and the second display area 221.

According to an embodiment, the electronic device 101 may provide a plurality of states based on the positional relationship of the first housing 210 and the second housing 220. For example, the electronic device 101 may provide a plurality of states based on the angle 301 between the first display area 211 and the second display area 221. For example, the electronic device 101 may provide a plurality of states based on the angle between the first direction 231 which the first display area 211 faces toward and the second direction 232 which the second display area 221 faces toward.

For example, the electronic device 101 may provide a first state in which the angle between the first direction 231 which the first display area 211 faces toward and the second direction 232 which the second display area 221 faces toward is within a reference range. For example, the electronic device 101 may provide a second state in which the first direction 231 which the first display area 211 faces toward and the second direction 232 which the second display area 221 faces toward are parallel.

According to an embodiment, the reference range in which the first state is provided may be changed based on an operation of the electronic device 101 and/or an orientation of the electronic device 101. For example, in case that the electronic device 101 is changed from an unfolded state (e.g., the second state) to a folded state in a state that another display (not illustrated) included in the first housing 210 and facing the display 201 is activated, the reference range may be set as a first range (e.g., an angle range of greater than 20 degrees and less than 160 degrees). For example, in case that the electronic device 101 is changed from the unfolded state (e.g., the second state) to the folded state in a state that another display (not illustrated) included in the first housing 210 and facing the display 201 is deactivated, the reference range may be set as a second range (e.g., an angle range of greater than 10 degrees and less than 150 degrees).

According to an embodiment, the electronic device 101 may provide the first state in which the angle between the first direction 231 which the first display area 211 faces toward and the second direction 232 which the second display area 221 faces toward is within the reference range. In the first state, a user input (e.g., at least one touch input) may be limited. For example, a touch input to a folding axis (e.g., the folding axis 237 of FIG. 2A or 2B) may be limited. For example, the touch input starting from a partial area of the first display area 211 may not be maintained up to a partial area of the second display area 221. For example, a user of the electronic device 101 may not be able to perform the touch input on an area around the folding axis using a part of the user's body (e.g., a finger).

In the following description, while a first application is displayed on the first display area 211 and the second display area 221, the electronic device and the operation of the electronic device for changing the position where an object used to display a user interface for displaying a second application on the second display area 221 are displayed may be described.

Figure 4:
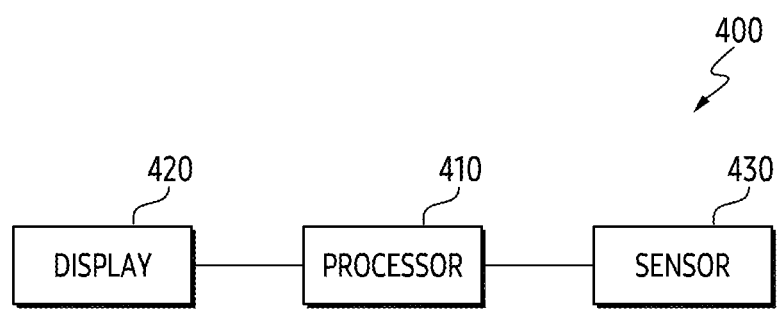
FIG. 4 is a block diagram illustrating an example configuration of an electronic device according to various embodiments.

FIG. 4 is a block diagram illustrating an example configuration of an electronic device according to various embodiments.

Referring to FIG. 4, an electronic device 400 may include some or all of the components of the electronic device 101 illustrated in FIG. 1. For example, the electronic device 400 may correspond to the electronic device 101 illustrated in FIG. 1, 2A, 2B, or 3.

According to an embodiment, the electronic device 400 may include a processor (e.g., including processing circuitry) 410, a display 420, and/or a sensor 430. According to an embodiment, the electronic device 400 may include at least one of the processor 410, the display 420, and the sensor 430. For example, at least some of the processor 410, the display 420, and the sensor 430 may be omitted according to an embodiment.

According to an embodiment, the processor 410 may be operably coupled with or connected with the display 420 and the sensor 430. For example, the processor 410 may include various processing circuitry and control the display 420 and the sensor 430. The display 420 and the sensor 430 may be controlled by the processor 410. For example, the processor 410 may be configured with at least one processor. The processor 410 may include at least one processor. For example, the processor 410 may correspond to a processor 120 of FIG. 1.

According to an embodiment, the processor 410 may include a hardware component for processing data based on one or more instructions. The hardware component for processing data may include, for example, an Arithmetic and Logic Unit (ALU), a Field Programmable Gate Array (FPGA), and/or a Central Processing Unit (CPU).

According to an embodiment, the electronic device 400 may include the display 420. For example, the display 420 may be a flexible display. For example, the display 420 may be folded along a folding axis (e.g., the folding axis 237 of FIG. 2A). The electronic device 400 may include a first housing (e.g., the first housing 210 of FIGS. 2A to 3) and a second housing (e.g., the second housing 220 of FIGS. 2A to 3). The electronic device 400 may be folded such that the first housing and the second housing overlap or superimpose each other. The electronic device 400 may be folded based on the folding axis. The display 420 may be folded along the folding axis based on the electronic device 400 being folded based on the folding axis. For example, the display 420 may correspond to a display module 160 of FIG. 1. For example, the display 420 may correspond to a display 201 of FIGS. 2A to 3.

According to an embodiment, the display 420 may include (or provide) a first display area and a second display area. The first display area may correspond to one surface of the first housing. The second display area may correspond to one surface of the second housing. For example, the display 420 may include the first display area and the second display area extending from the first display area. The first display area and the second display area may be divided based on the folding axis. For example, the first display area may correspond to a first display area 211 of FIGS. 2A to 3. The second display area may correspond to a second display area 221 of FIGS. 2A to 3.

For example, while the electronic device 400 is in a first state in which an angle between the first direction which the first display area faces toward and the second direction which the second display area faces toward is within the reference range, the display 420 may operate in a folded state. While the display 420 operates in a folded state, the first display area and the second display area may be divided based on the folding axis.

For example, while the electronic device 400 is in a second state in which the first direction which the first display area faces toward and the second direction which the second display area faces toward are parallel, the display 420 may operate in an unfolded state. While the display 420 operates in an unfolded state, the first display area and the second display area may substantially form one flat surface.

According to an embodiment, the electronic device 400 may include the sensor 430. The sensor 430 may be used to obtain various information. For example, the sensor 430 may be used to obtain information on the electronic device 400. For example, the sensor 430 may be configured with at least one sensor. The sensor 430 may include at least one sensor. For example, the sensor 430 may correspond to a sensor module 176 of FIG. 1.

For example, the sensor 430 may include a hall sensor (e.g., the hall sensor 310 of FIG. 3). The hall sensor may be used to identify a positional relationship of the first housing and the second housing of the electronic device 400. The hall sensor may be used to identify an angle between the first display area and the second display area. The hall sensor may be used to identify the first direction which the first display area faces toward and the second direction which the second display area faces toward.

For example, the sensor 430 may include an acceleration sensor and/or a gyro sensor. The acceleration sensor may identify (or measure or detect) the acceleration of the electronic device 400 in three directions of x-axis, y-axis, and z-axis. The gyro sensor may identify (or measure or detect) the angular velocity of the electronic device 400 in three directions of x-axis, y-axis, and z-axis. According to an embodiment, the electronic device 400 may include a motion sensor including the acceleration sensor and the gyro sensor.

According to an embodiment, the processor 410 may identify a posture (or orientation) of the electronic device 400 using the acceleration sensor and/or the gyro sensor. The processor 410 may identify an angle between the second direction which the second display area faces toward and a reference direction using the acceleration sensor and/or the gyro sensor. For example, the reference direction may refer, for example, to a direction which gravity faces toward. The processor 410 may identify that the electronic device 400 operates in a reference posture based on identifying that the angle between the second direction which the second display area faces toward and the reference direction is within a predetermined range (e.g., a range greater than or equal to 90 degrees and less than or equal to 180 degrees). For example, the reference posture may refer, for example, to a state in which the second housing is placed on a fixed object (e.g., a table) of the electronic device 400 in contact with the fixed object. For example, the reference posture may refer, for example, to a state in which the second housing is gripped by the user of the electronic device 400. According to an embodiment, the reference posture may refer, for example, to a posture for providing one of a portrait mode (or vertical mode) and a landscape mode (or horizontal mode) in the electronic device 400.

Figure 5:
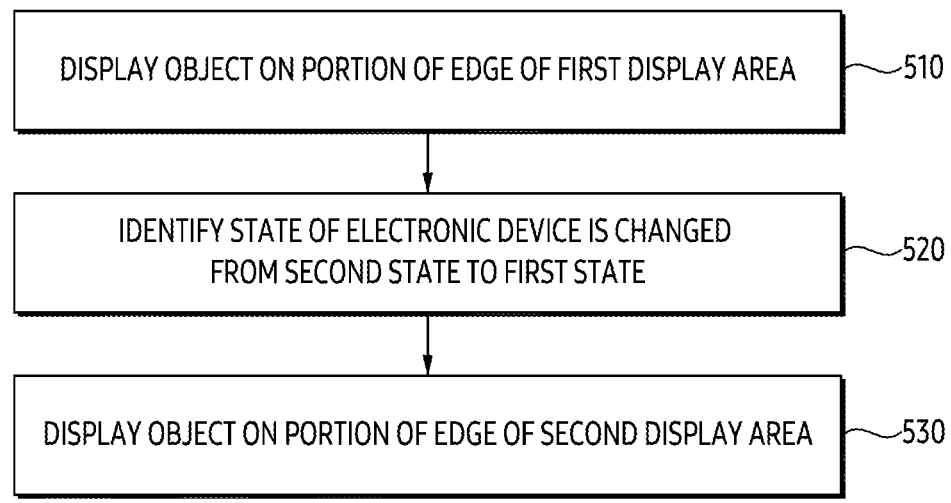
FIG. 5 is a flowchart illustrating an example operation of an electronic device according to various embodiments.

FIG. 5 is a flowchart illustrating an example operation of an electronic device according to various embodiments.

Referring to FIG. 5, in operation 510, a processor 410 may display an object on a portion of an edge of a first display area. For example, while an electronic device 400 in a second state operates in a reference posture in which an angle between a second direction and a reference direction is within a predetermined range, the processor 410 may display the object at least partially superimposed on a first user interface displayed within the first display area and a second display area, on the portion of the edge of the first display area. For example, the processor 410 may identify a display area for displaying the object as the first display area based on that the posture of the electronic device 400 is the reference posture. The processor 410 may display the object at least partially superimposed on the first user interface on the portion of the edge of the first display area based on that the posture of the electronic device 400 is the reference posture.

According to an embodiment, the electronic device 400 may be in the second state. The processor 410 may identify that the state of the electronic device 400 is the second state using a sensor 430 (e.g., a hall sensor). For example, the processor 410 may use the sensor 430 to identify that the angle between the first direction which the first display area faces toward and the second direction which the second display area faces toward is within the reference range. The processor 410 may identify that the state of the electronic device 400 is the second state based on identifying that the first direction and the second direction are parallel. For example, the processor 410 may identify that the first display area and the second display area form a substantially flat surface.

According to an embodiment, the processor 410 may identify that the angle of between the second direction and the reference direction is within the predetermined range using the sensor 430 (e.g., an acceleration sensor or a gyro sensor). The processor 410 may identify that the electronic device 400 operates in the reference posture based on identifying that the angle between the second direction and the reference direction is within the predetermined range. For example, the processor 410 may identify that the electronic device 400 is in a state placed in a fixed position based on the electronic device 400 operating in the reference posture. For example, the processor 410 may identify that the second housing of the electronic device 400 is in a gripped state based on the electronic device 400 operating in the reference posture. For example, the processor 410 may operate in a portrait mode (or vertical mode) based on the electronic device 400 operating in the reference posture.

According to an embodiment, the processor 410 may display the first user interface in the first display area and the second display area. For example, the first user interface may be related to a first application. For example, the processor 410 may display the first user interface according to the first application within the first display area and the second display area based on the execution of the first application. For example, the first user interface may include an interface related to a home screen.

According to an embodiment, the processor 410 may display an object on a portion of the edge of the first display area perpendicular to a folding axis. For example, the edge of the first display area may be perpendicular to the folding axis. For example, the processor 410 may display an object on one of two edges of the first display area perpendicular to the folding axis.

According to an embodiment, the processor 410 may display an object at least partially superimposed on the first user interface. For example, the object may be used to display a second user interface. The object at least partially superimposed on the first user interface may be referred to as an edge panel.

According to an embodiment, the processor 410 may identify a user input to the object. The processor 410 may display the second user interface in response to the user input to the object. For example, the user input to the object may be set to one of a swipe input, a tap input, and a double tap input. For example, the second user interface may include at least one executable object corresponding to at least one application, respectively. The processor 410 may identify an input to a first executable object among at least one executable object. The processor 410 may execute an application corresponding to the first executable object in response to the input.

According to an embodiment, at least one executable object included in the second user interface may be changed. The processor 410 may receive an input for setting at least one application displayed through the second user interface. The processor 410 may set to display at least one executable object corresponding to at least one set application through the second user interface based on an input for setting at least one application displayed through the second user interface.

In operation 520, the processor 410 may identify that the state of the electronic device 400 is changed from the second state to the first state. For example, the processor 410 may identify that the state of the electronic device 400 is changed from the second state to the first state while the object used to display the second user interface is displayed on a portion of the edge of the first display area.

According to an embodiment, the processor 410 may identify an angle between the first direction which the first display area faces toward and the second direction which the second display area faces toward using the sensor 430. The processor 410 may identify that the angle between the first direction and the second direction is changed within the reference range. The processor 410 may identify that the state of the electronic device 400 is changed from the second state to the first state based on identifying that the angle between the first direction and the second direction is changed within the reference range. According to an embodiment, the processor 410 may identify the angle between the first display area and the second display area using the sensor 430. Based on identifying that the angle between the first display area and the second display area is changed within another reference range distinguished from the above-described reference range, it may be identified that the state of the electronic device 400 is changed from the second state to the first state.

In operation 530, the processor 410 may display an object on a portion of the edge of the second display area. For example, the processor 410 may display the object on the portion of the edge of the second display area extending from the edge of the first display area in response to identifying that the state of the electronic device 400 is changed from the second state to the first state.

According to an embodiment, the processor 410 may change the display position of the object used to display the second user interface from the portion of the edge of the first display area to the portion of the edge of the second display area in response to identifying that the state of the electronic device 400 is changed from the second state to the first state. For example, the edge of the second display area on which the object is displayed may be an edge extending from the edge of the first display area.

According to an embodiment, the processor 410 may identify a first user input to the object displayed on the portion of the edge of the second display area. The processor 410 may display the second user interface based on the first user input. For example, processor 410 may display the second user interface at least partially superimposed on the first user interface within the second display area based on the first user input. The second user interface may be at least partially superimposed on the first user interface within the second display area.

According to an embodiment, the processor 410 may display at least one executable object corresponding to at least one application, respectively, using the second user interface. The processor 410 may identify the second user input to a first executable object among at least one executable objects included in the second user interface displayed in the second display area. Based on the second user input, the processor 410 may display the first user interface within the first display area and display a third user interface related to a second application corresponding to the first executable object within the second display area.

For example, the processor 410 may display the first user interface related to the first application through the first display area and the second display area. The processor 410, together with the first application, may identify the first user input to the object used to display the second user interface for executing the second application distinguished from the first application. After identifying the first user input, the processor 410 may identify the second user input to the first executable object included in the second user interface displayed within the second display area. The processor 410 may display the first user interface related to the first application on the first display area in response to the second user input. The processor 410 may display the third user interface related to the second application corresponding to the first executable object on the second display area in response to the second user input. For example, the processor 410 may simultaneously execute the first application and the second application using the display 420. The processor 410 may display the third user interface in the second display area based on the execution of the second application. The processor 410 may display the first user interface in the first display area based on the execution of the second application.

According to an embodiment, the processor 410 may display the object on a portion of the edge of the second display area by superimposing on the third user interface while the third user interface is displayed in the second display area. For example, while the first user interface is displayed in the first display area and the third user interface is displayed in the second display area, the processor 410 may display an object used to display the second user interface on the portion of the edge of the second display area by superimposing on the third user interface. For example, the processor 410 may maintain the display of the object even after the third user interface is displayed in the second display area.

According to an embodiment, the processor 410 may identify that the state of the electronic device 400 is changed from the first state to the second state while the first user interface is displayed in the first display area and the third user interface is displayed in the second display area. The processor 410 may display the object on a portion of the edge of the first display area in response to identifying that the state of the electronic device 400 is changed from the first state to the second state.

According to an embodiment, the processor 410 may display an object used to display the second user interface on the second display area based on the state of the electronic device 400 is in the first state. For example, the processor 410 may display the object used to display the second user interface on a portion of the edge of the second display area based on the state of the electronic device 400 is in the first state. According to an embodiment, the processor 410 may display the object used to display the second user interface on the first display area based on the state of the electronic device 400 is in the second state. For example, the processor 410 may display the object used to display the second user interface on a portion of the edge of the first display area based on the state of the electronic device 400 is in the second state.

Figure 6:
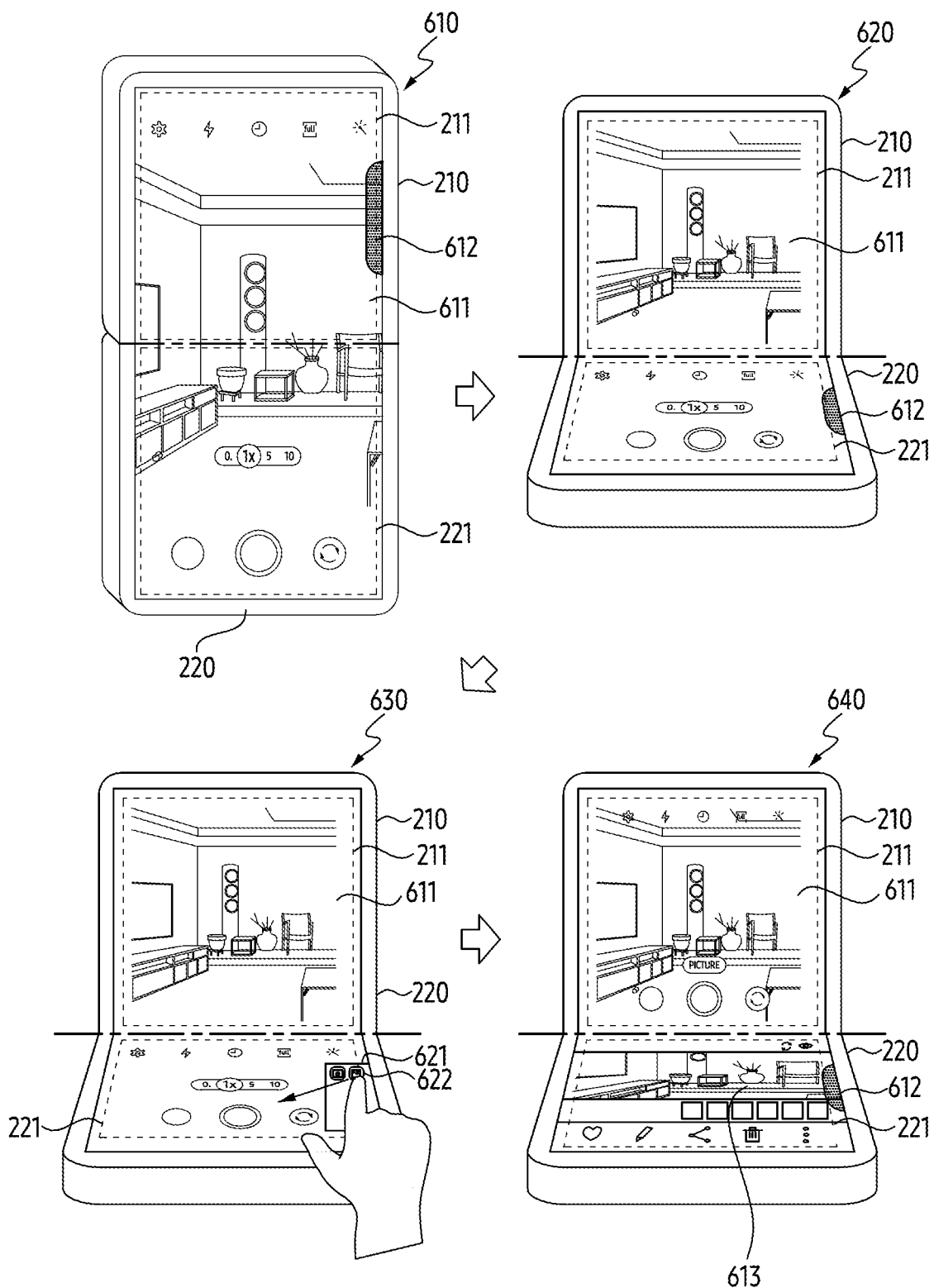
FIG. 6 is a diagram illustrating an example of an operation of an electronic device according to various embodiments.

FIG. 6 is a diagram illustrating an example of an operation of an electronic device according to various embodiments.

Referring to FIG. 6, in a state 610, a state of an electronic device 400 may be in a second state in which a first direction which a first display area 211 faces toward and a second direction which a second display area 221 faces toward are parallel. For example, the state of the electronic device 400 may be in the second state in which the first display area 211 and the second display area 221 substantially configure one flat surface.

For example, the processor 410 may identify a positional relationship between the first housing 210 and the second housing 220 using a sensor 430 (e.g., a hall sensor). For example, the processor 410 may identify an angle between the first display area 211 and the second display area 221 using the sensor 430. The processor 410 may identify an angle between the first direction which the first display area 211 faces toward and the second direction which the second display area 221 faces toward using the sensor 430. The processor 410 may identify that the state of the electronic device 400 is in the second state based on identifying that the first direction and the second direction are parallel.

According to an embodiment, the processor 410 may identify the posture of the electronic device 400. The processor 410 may identify the posture of the electronic device 400 using the sensor 430 (e.g., an acceleration sensor or a gyro sensor). The processor 410 may identify that the electronic device 400 operates in a reference posture. For example, the processor 410 may identify that the electronic device 400 operates in the reference posture based on identifying that an angle between the second direction and the reference direction is within a predetermined range (e.g., a range greater than or equal to 90 degrees and less than or equal to 180 degrees).

According to an embodiment, the processor 410 may execute a first application (e.g., a camera application). The processor 410 may display the first user interface 611 related to the first application in the first display area 211 and the second display area 221. The processor 410 may display an object 612 at least partially superimposed on the first user interface 611. The processor 410 may display the object 612 on a portion of the edge of the first display area 211. The processor 410 may identify whether the state of the electronic device 400 is changed from the second state to the first state while the object 612 is displayed on the portion of the edge of the first display area 211.

In a state 620, the processor 410 may identify that the state of the electronic device 400 is changed from the second state to the first state. The processor 410 may display the object 612 on a portion of the edge of the second display area 221 extending from the edge of the first display area 211 in response to identifying that the state of the electronic device 400 is changed from the second state to the first state.

According to an embodiment, the processor 410 may display a first area for displaying content among the first user interface 611 in the first display area 211 and may display a second area for controlling the content among the first user interface 611 in the second display area 221, in response to identifying that the state of the electronic device 400 is changed from the second state to the first state. For example, the processor 410 may display the first area for displaying a preview image among the first user interface 611 of the camera application in the first display area 211, may display a second area for displaying objects for taking pictures (or videos), switching cameras, enlarging, and/or reducing operations in the second display area 221.

According to an embodiment, the processor 410 may identify whether a first user input to the object 612 displayed on a portion of the edge of the second display area 221 is identified (or received).

In a state 630, the processor 410 may identify the first user input to the object 612. The processor 410 may display a second user interface 621 at least partially superimposed on the first user interface 611 within the second display area 221 based on the first user input. The second user interface 621 may include at least one executable object including a first executable object 622. The processor 410 may identify a second user input to the first executable object 622. For example, the first executable object 622 may be used for execution of the first application. The processor 410 may identify a second user input for simultaneously executing the running second application (e.g., a camera application) and the first application (e.g., a gallery application). For example, the processor 410 may identify the second user input to be dropped within the second display area 622 excluding the second user interface 621 by dragging the first executable object 622.

In a state 640, the processor 410 may display the first user interface 611 within the first display area 211 and the third user interface 613 within the second display area 221, based on the second user input. The processor 410 may display the first user interface 611 related to the second application within the first display area 211 and the third user interface 613 related to the first application within the second display area 221 by additionally executing the first application based on the second user input.

According to an embodiment, while simultaneously displaying the first user interface 611 and the third user interface 613, the processor 410 may display the object 612 on a portion of the edge of the second display area 221 as a superimpose on the third user interface 613.

Although not illustrated, the processor 410 may identify that the state of the electronic device 400 is changed from the first state to the second state. The processor 410 may display the object 612 on a portion of the edge of the first display area 211 in response to identifying that the state of the electronic device 400 is changed from the first state to the second state.

Figure 7:
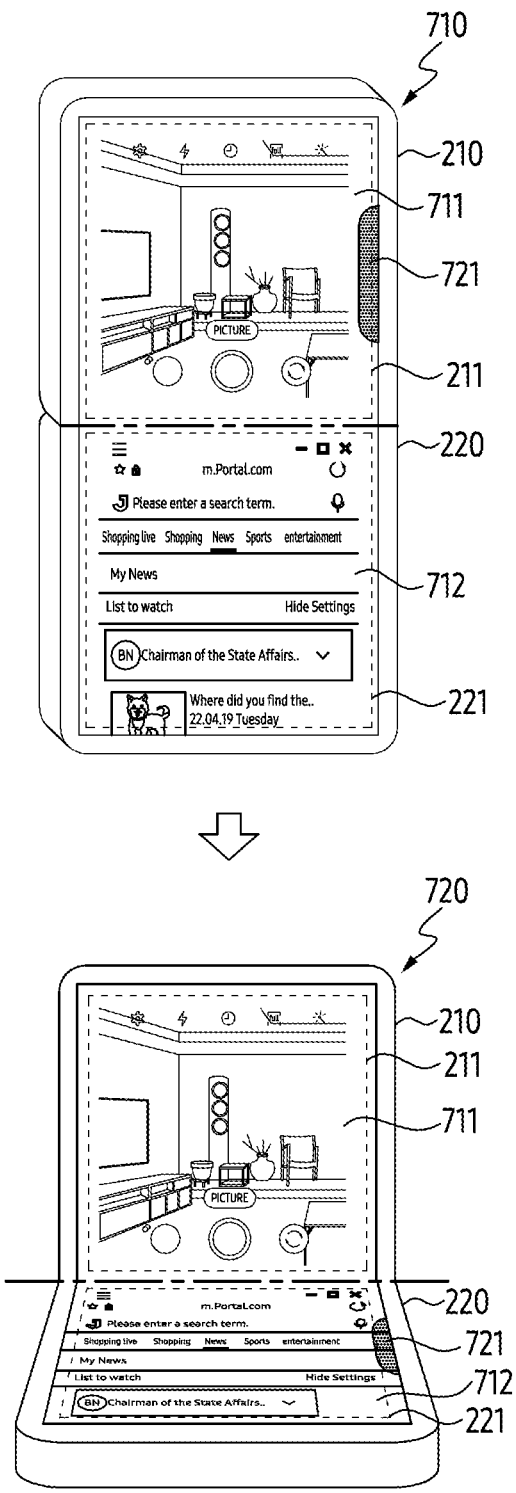
FIG. 7 is a diagram illustrating an example of an operation of an electronic device according to various embodiments.

FIG. 7 is a diagram illustrating an example of an operation of an electronic device according to various embodiments.

Referring to FIG. 7, in a state 710, an electronic device 400 may operate in a second state in which a first direction which a first display area 211 faces toward and a second direction which a second display area 221 faces toward are parallel. A processor 410 may identify that the posture of the electronic device 400 is a reference posture in which an angle between the second direction and a reference direction is within a predetermined range.

The processor 410 may display a first user interface 711 for a first application (e.g., a camera application) within the first display area 211 while the electronic device 400 operates in the second state. The processor 410 may display a second user interface 712 for a second application (e.g., an Internet application) within the second display area 221 while the electronic device 400 operates in the second state. The processor 410 may display the object 721 superimposed (or at least partially superimposed) on the second user interface 712. The object 721 may be used to display the second user interface.

For example, the processor 410 may identify a first user input to the object 721. The processor 410 may display a third user interface on a portion of an edge of the first display area 211 based on the first user input. The processor 410 may identify a second user input to a first executable object among at least one executable objects included in the third user interface. The processor 410 may identify the second user input to be dropped within one of a first user interface 711 (or the first display area 211) or a second user interface 721 (or the second display area 221) by dragging the first executable object.

According to an embodiment, the processor 410 may execute a third application corresponding to the first executable object based on the second user input. For example, the processor 410 may change one of the first application and the second application, which are simultaneously executed (or displayed) in the electronic device 400, to the third application based on the second user input.

For example, the processor 410 may display a fourth user interface related to the third application within the first display area 211 and may display the second user interface 712 related to the second application within the second display area 221, based on the second user input to be dropped in the first user interface 711 (or the first display area 211) by dragging the first executable object.

For example, the processor 410 may display a fourth user interface related to the third application within the second display area 221 and may display the first user interface 711 related to the first application within the first display area 211, based on the second user input to be dropped in the second user interface 712 (or the second display area 221) by dragging the first executable object.

According to an embodiment, the processor 410 may identify whether the state of the electronic device 400 is changed from the second state to the first state while the object 721 is displayed within the first display area 211.

In a state 720, the processor 410 may identify that the state of the electronic device 400 is changed from the second state to the first state. For example, the processor 410 may use a sensor 430 (e.g., a hall sensor) to identify an angle between the first direction (or the first display area 211) which the first display area 211 faces toward and the second direction (or the second display area 221) which the second display area 221 faces toward. The processor 410 may identify that the state of the electronic device 400 is changed from the second state to the first state based on identifying that the angle between the first direction (or the first display area) and the second direction (or the second display area) is changed within the reference range.

According to an embodiment, the processor 410 may display the object 721 on a portion of the edge of the second display area 221 extending from the edge of the first display area 211 in response to identifying that the state of the electronic device 400 is changed from the second state to the first state.

For example, the processor 410 may remove the object 721 at least partially superimposed on the first user interface 711 related to the first application in response to identifying that the state of the electronic device 400 is changed from the second state to the first state. The processor 410 may display the object 721 at least partially superimposed on the second user interface 712 related to the second application in response to identifying that the state of the electronic device 400 is changed from the second state to the first state.

Although not illustrated, the processor 410 may identify a first user input to the object 721. The processor 410 may display the third user interface superimposed on the second user interface 712 in response to the first user input. The third user interface may include at least one executable object corresponding to at least one application. The processor 410 may identify a second user input to a first executable object among at least one executable object. For example, the second user input may include an input that drags the first executable object and drops it into the second user interface 712. The processor 410 may change the second user interface 712 to a fourth user interface related to a third application corresponding to the first executable object in response to the second user input. Accordingly, the processor 410 may display the first user interface 711 related to the first application within the first display area 211 and may display the fourth user interface related to the third application within the second display area 221 in response to the second user input.

Figure 8:
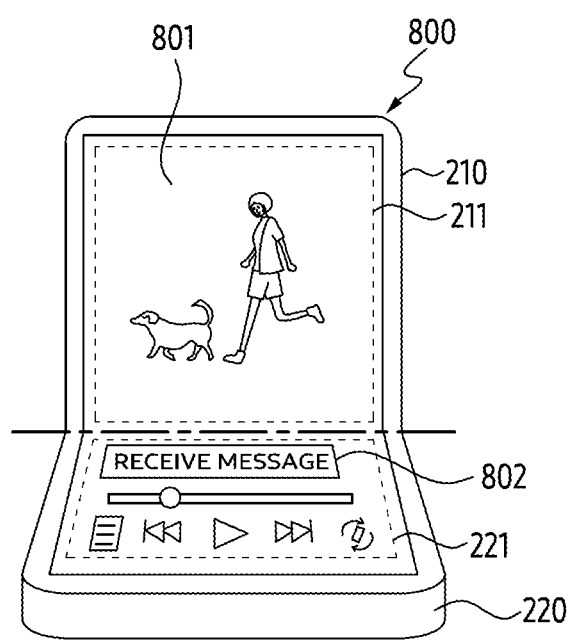
FIG. 8 is a diagram illustrating an example of an operation of an electronic device according to various embodiments.

FIG. 8 is a diagram illustrating an example of an operation of an electronic device according to various embodiments.

Referring to FIG. 8, in a state 800, an electronic device 400 may identify that a state of the electronic device 400 is in a first state based on identifying that an angle between a first direction which a first display area 211 faces toward and a second direction which a second display area 221 faces toward is within a reference range. The processor 410 may identify that the electronic device 400 operates in a reference posture in which an angle between the second direction and a reference direction is within a predetermined range.

According to an embodiment, while the electronic device 400 in the first state operates in the reference posture, the processor 410 may display a first user interface 801 related to a first application (e.g., a video playback application). The processor 410 may display a first area for displaying content (e.g., a video) among the first user interface 801 within the first display area 211. The processor 410 may display a second area for controlling (e.g., playing or stopping) content among the first user interface 801 within the second display area 221.

According to an embodiment, the processor 410 may identify an event related to the electronic device 400. For example, the event related to the electronic device 400 may include various events in which a notification is displayed within the electronic device 400. The event related to the electronic device 400 may include at least one of a message reception event, a call reception event, and an application notification event.

According to an embodiment, the processor 410 may display a notification message 802 for indicating the identified event. For example, the processor 410 may display the notification message 802 for indicating the identified event as superimpose on a portion of the first user interface 801 displayed within the second display area 221, based on identifying the event related to the electronic device 400. For example, the processor 410 may display the notification message 802 for indicating the identified event as superimpose on the second area for controlling (e.g., playing or stopping) content among the first user interface 801 displayed within the second display area 221.

According to an embodiment, when the state of the electronic device 400 is in a first state, the processor 410 may display the notification message 802 for indicating the identified event within the first display area. When the state of the electronic device 400 is in the second state, the processor 410 may display the notification message 802 for indicating the identified event within the second display area.

Figure 9:
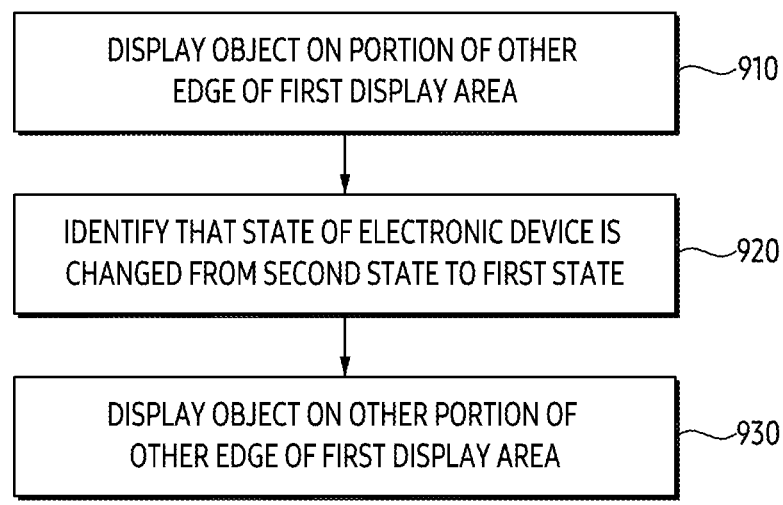
FIG. 9 is a flowchart illustrating an example operation of an electronic device according to various embodiments.

FIG. 9 is a flowchart illustrating an example operation of an electronic device according to various embodiments.

Referring to FIG. 9, in operation 910, a processor 410 may display an object on a portion of another edge of a first display area 211. For example, the processor 410 may display an object on a portion of another edge of the first display area 211 while an electronic device 400 in the second state operates in a posture distinct from a reference posture.

According to an embodiment, the electronic device 400 may operate in a second state. The processor 410 may identify that the state of the electronic device 400 is in the second state based on identifying that a first direction which the first display area 211 faces toward and a second direction which a second display area 221 faces toward are parallel.

According to an embodiment, the electronic device 400 may operate in a portrait mode (or vertical mode) in the reference posture. The electronic device 400 may operate in a landscape mode (or horizontal mode) in another posture. According to an embodiment, a mode set to operate in the reference posture may be changed according to a form factor of the electronic device 400. For example, the electronic device 400 may operate in a landscape mode in the reference posture and may operate in a portrait mode in the other posture.

According to an embodiment, the processor 410 may display an object on a portion of another edge of the first display area 211. For example, an object may be used to display a second user interface. For example, another edge of the first display area 211 may be an edge parallel to a folding axis. The processor 410 may display an object for displaying the second user interface on a portion of an edge parallel to the folding axis of the first display area 211.

In operation 920, the processor 410 may identify that the state of the electronic device 400 is changed from the second state to the first state. For example, the processor 410 may identify that the state of the electronic device 400 is changed from the second state to the first state while the electronic device 400 operates in the other posture from the reference posture. For example, the processor 410 may identify an angle between the first direction which the first display area 211 faces toward and the second direction which the second display area 221 faces toward while the electronic device 400 is operating in the other posture. The processor 410 may identify that the state of the electronic device 400 is changed from the second state to the first state based on identifying that the angle between the first direction and the second direction is changed within the reference range.

In operation 930, the processor 410 may display an object on another portion of another edge of the first display area. For example, the processor 410 may display an object on another portion of another edge of the first display area 211 in response to identifying that the state of the electronic device 400 is changed from the second state to the first state.

According to an embodiment, the processor 410 may change the position of an object used to display the second user interface from the portion of another edge of the first display area 211 to another portion of the other edge. For example, the processor 410 may change the position of the object from an upper end of another edge of the first display area 211 to a lower end of the other edge. The processor 410 may change the position of the object from the upper end of another edge of the first display area 211 to a lower end of the other edge in order to increase the convenience of a user operating with one hand.

Figure 10:
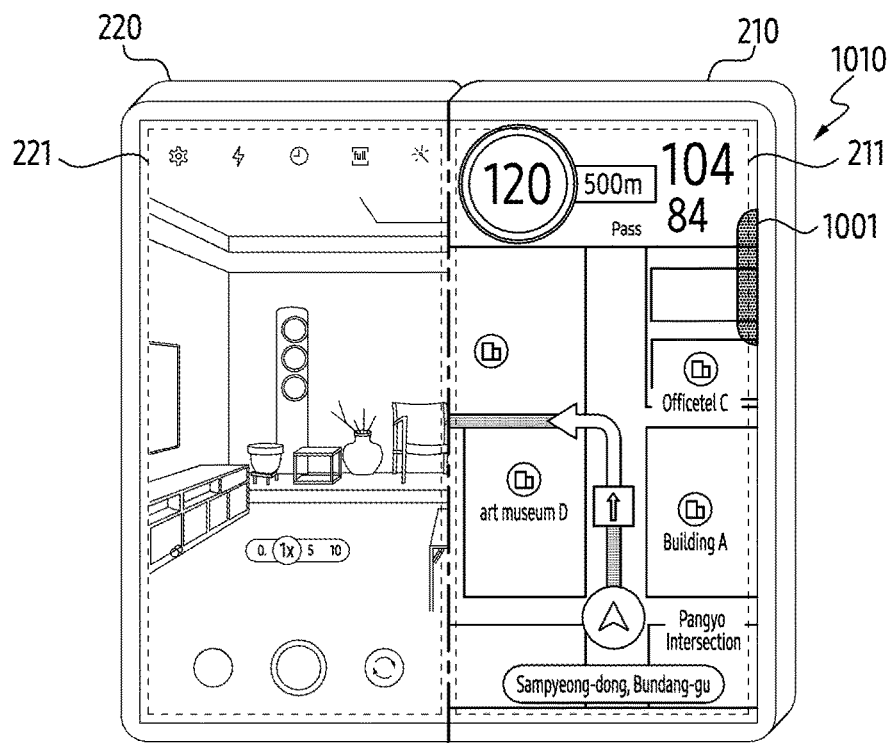
FIG. 10 is a diagram illustrating an example of an operation of an electronic device according to various embodiments.
Figure 10:
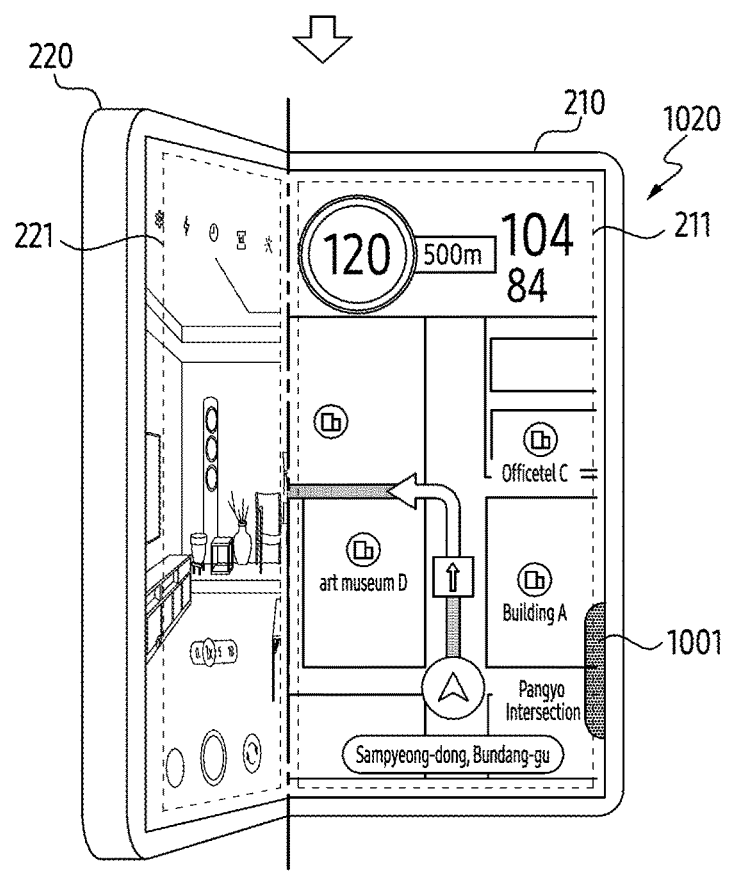

FIG. 10 is a diagram illustrating an example of an operation of an electronic device according to various embodiments.

FIG. 10 illustrates an example in which an object 1001 is displayed through a display 420 of an electronic device 400 according to operations 910 to 930 of FIG. 9. Referring to FIG. in a state 1010, the electronic device 400 may operate in another posture distinct from a reference posture. For example, in case that the electronic device 400 is set to operate in a portrait mode in the reference posture, the other posture may refer, for example, to a posture set to operate in a landscape mode. For example, in case that the electronic device 400 is set to operate in the landscape mode in the reference posture, the other posture may refer, for example, to a posture set to operate in the portrait mode.

According to an embodiment, the processor 410 may display an object 1001 for displaying the second user interface on a part of another edge distinguished from the edge perpendicular to the folding axis, among the edges of the first display area 211 among the first display area 211 and the second display area 221. For example, the processor 410 may display the object 1001 at least partially superimposed on a first user interface displayed in the first display area 211 and the second display area 221. According to an embodiment, the processor 410 may display the first user interface related to a first application in the first display area 211. The processor 410 may display a third user interface related to a second application in the second display area 221. The processor 410 may display the object 1001 at least partially superimposed on the first user interface displayed in the first display area. According to an embodiment, in case that the electronic device 400 is turned over and operated, the processor 410 may display the object 1001 in the second display area 221.

According to an embodiment, the processor 410 may identify whether a state of the electronic device 400 is changed from a second state to a first state. For example, the processor 410 may identify whether the state of the electronic device 400 is changed from the second state to the first state while the electronic device 400 operates in the other posture different from the reference posture.

In a state 1020, the processor 410 may display the object 1001 on another portion of another edge of the first display area 211 in response to identifying that the state of electronic device 400 is changed from the second state to the first state. For example, the processor 410 may change the position of the object 1001 to another portion of another edge distinguished from an edge perpendicular to the folding axis. For example, the processor 410 may change the position of the object 1001 from an upper end of another edge of the first display area 211 to a lower end of the other edge.

According to an embodiment, a user of the electronic device 400 may change the electronic device 400 to a first state to reduce a load applied to a part of the user's body (e.g., the wrist) while using the electronic device 400 with one hand. The processor 410 may change the position at which the object 1001 is displayed to improve user convenience in a state where the electronic device 400 is gripped with one hand.

Figure 11:
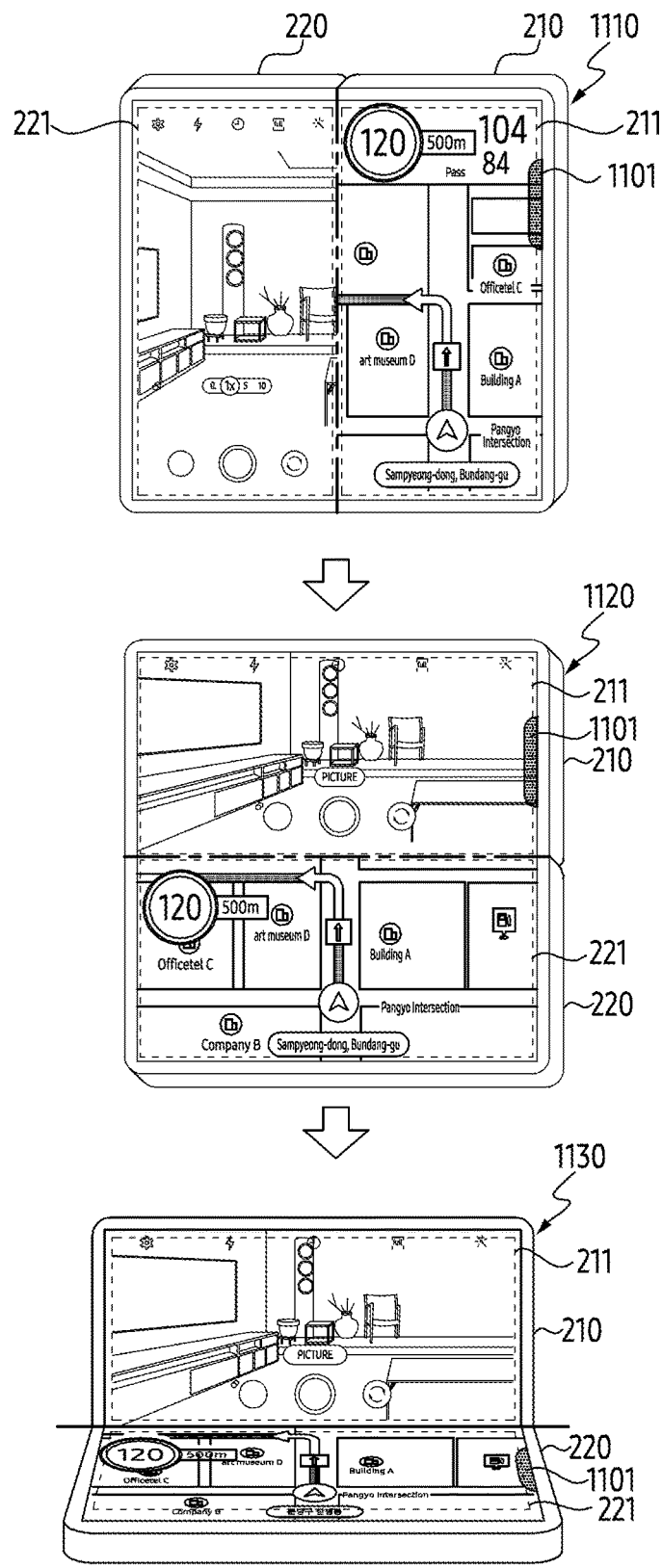
FIG. 11 is a diagram illustrating an example of an operation of an electronic device according to various embodiments.

FIG. 11 is a diagram illustrating an example of an operation of an electronic device according to various embodiments.

Referring to FIG. 11, a state 1110 may correspond to a state 1010 of FIG. 10. In the state 1110, an electronic device 400 may operate in another posture distinguished from a reference posture. For example, the processor 410 may identify that a posture of the electronic device 400 is another posture using a sensor 430 (e.g., an acceleration sensor, a gyro sensor, or a hall sensor). For example, in case that the electronic device 400 is set to provide a landscape mode in the reference posture, the processor 410 may identify that the posture of the electronic device 400 is another posture in which a portrait mode is provided.

According to an embodiment, while the electronic device 400 operates in another posture, the processor 410 may display an object 1101 for displaying a second user interface on a portion of another edge distinguished from an edge perpendicular to a folding axis among the edges of a first display area 211 among the first display area 211 and a second display area 221. The object 1101 may be displayed at least partially superimposed on a first user interface displayed within the first display area 211 and the second display area 221.

According to an embodiment, the processor 410 may identify whether the posture of the electronic device 400 is changed from another posture to the reference posture. For example, the processor 410 may identify whether the posture of the electronic device 400 is changed from the other posture to the reference posture using the sensor 430. For example, the processor 410 may identify that the electronic device 400 changes from the reference posture for providing the portrait mode to another posture for providing the landscape mode. According to an embodiment, in case that the electronic device 400 provides the landscape mode in the reference posture, the processor 410 may identify that the electronic device 400 is changed from the reference posture for providing the landscape mode to another posture for providing the portrait mode.

In a state 1120, the processor 410 may identify that the posture of the electronic device 400 is changed from another posture to the reference posture. In response to identifying that the posture of the electronic device 400 is changed from the other posture to the reference posture, the processor 410 may display the object 1101 for displaying the second user interface on a portion of an edge perpendicular to the folding axis among the edges of the first display area 211. The object 1101 may be displayed at least partially superimposed on the first user interface displayed within the first display area 211 and the second display area 221. The processor 410 may change a position of the object 1101 from a portion of another edge parallel to the folding axis to a portion of an edge perpendicular to the folding axis.

According to an embodiment, the processor 410 may identify whether the state of the electronic device 400 is changed from the second state to the first state. The processor 410 may identify whether the state of the electronic device 400 is changed from the second state to the first state by identifying an angle between a first direction and a second direction.

In a state 1130, the processor 410 may display the object 1101 on a portion of an edge of the second display area 221 extending from an edge of the first display area 211 in response to identifying that the state of the electronic device 400 is changed from the second state to the first state.

Figure 12:
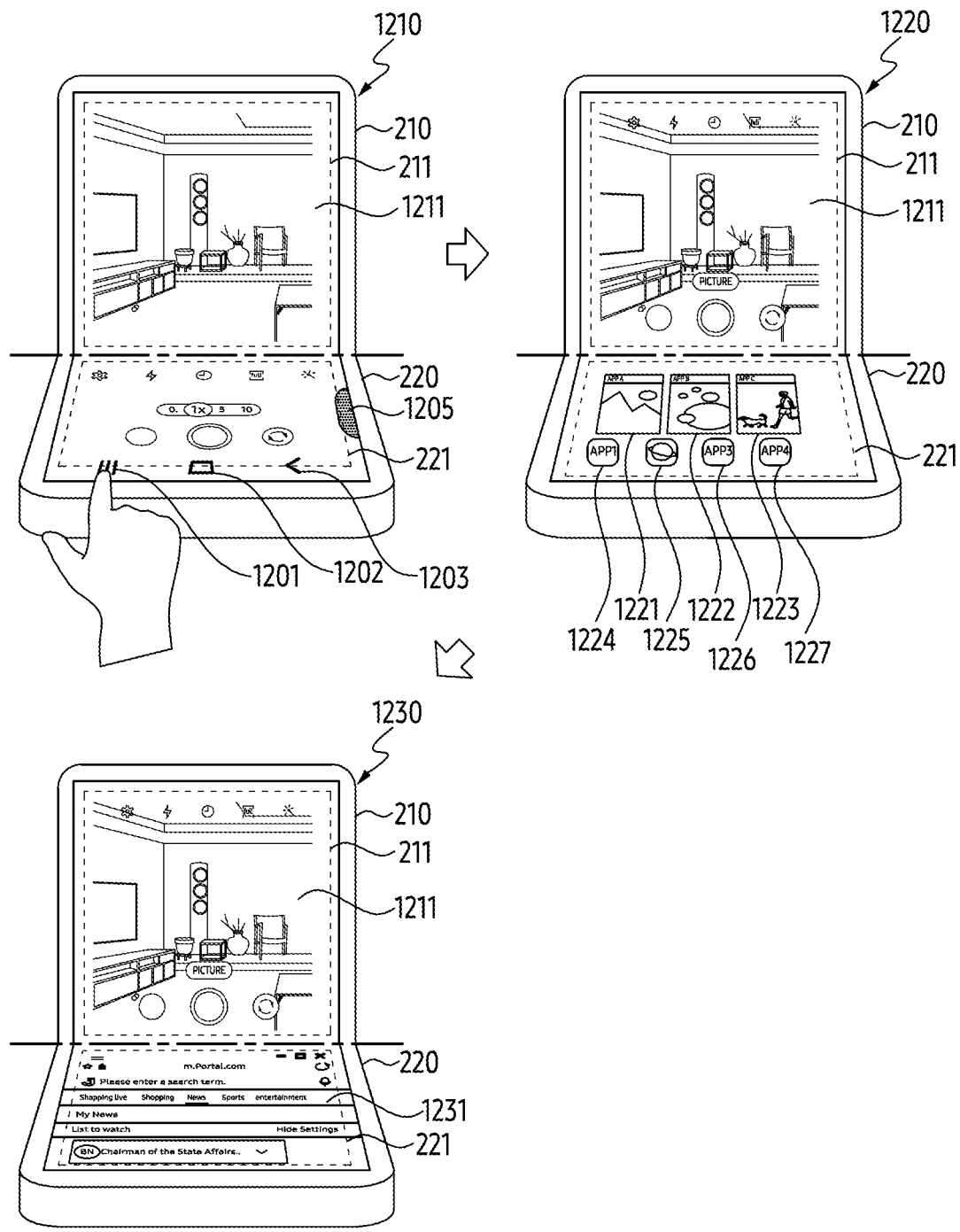
FIG. 12 is a diagram illustrating an example of an operation of an electronic device according to various embodiments.

FIG. 12 is a diagram illustrating an example of an operation of an electronic device according to various embodiments.

Referring to FIG. 12, in a state 1210, a processor 410 may display a first user interface 1211 related to a first application (e.g., a video playback application) in a first display area 211 and a second display area 221. For example, the processor 410 may display an object 1205 superimposed on the first user interface 1211 displayed in the second display area 221. For example, the processor 410 may display a first area for displaying content related to the first application within the first display area 211. The processor 410 may display a second area for controlling content related to the first application within the second display area 221. The processor 410 may display a plurality of elements for controlling content related to the first application within the second display area 221 while displaying content related to the first application within the first display area 211.

According to an embodiment, the second display area 221 may include a first button 1201 for checking an application running in the background, a second button 1202 for moving to the home screen, and a third button 1203 for performing a go-back function. According to an embodiment, the processor 410 may identify a user input to one of the first button 1201 to the third button 1203.

In a state 1220, the processor 410 may display the first user interface 1211 related to the first application within the first display area 211 in response to identifying a user input to the first button 1201. The processor 410 may display all of the first user interface displayed within the first display area 211 and the second display area 221 in the state 1210 within the first display area 211 in the state 1220. The processor 410 may display content related to the first application and a plurality of elements for controlling the first application within the first display area 211.

The processor 410 may display a plurality of executable objects for representing at least one application running in the background and at least one recently executed application within the second display area 221 in response to identifying the user input to the first button 1201. For example, the plurality of executable objects may correspond to a plurality of applications, respectively.

For example, the processor 410 may display an executable object 1221, an executable object 1222, and an executable object 1223 for representing at least one application running in the background. The processor 410 may display an executable object 1224, an executable object 1225, an executable object 1226, and an executable object 1227 for representing at least one recently executed application.

In operation 1230, the processor 410 may identify an input to the executable object 1225. For example, the executable object 1225 may be used to execute a second application. The processor 410 may display a second user interface related to the second application within the second display area 221 in response to identifying a user input to the executable object 1225. Accordingly, the processor 410 may display the first user interface 1211 related to the first application within the first display area 211 and display a second user interface 1231 related to the second application within the second display area 221.

Figure 13:
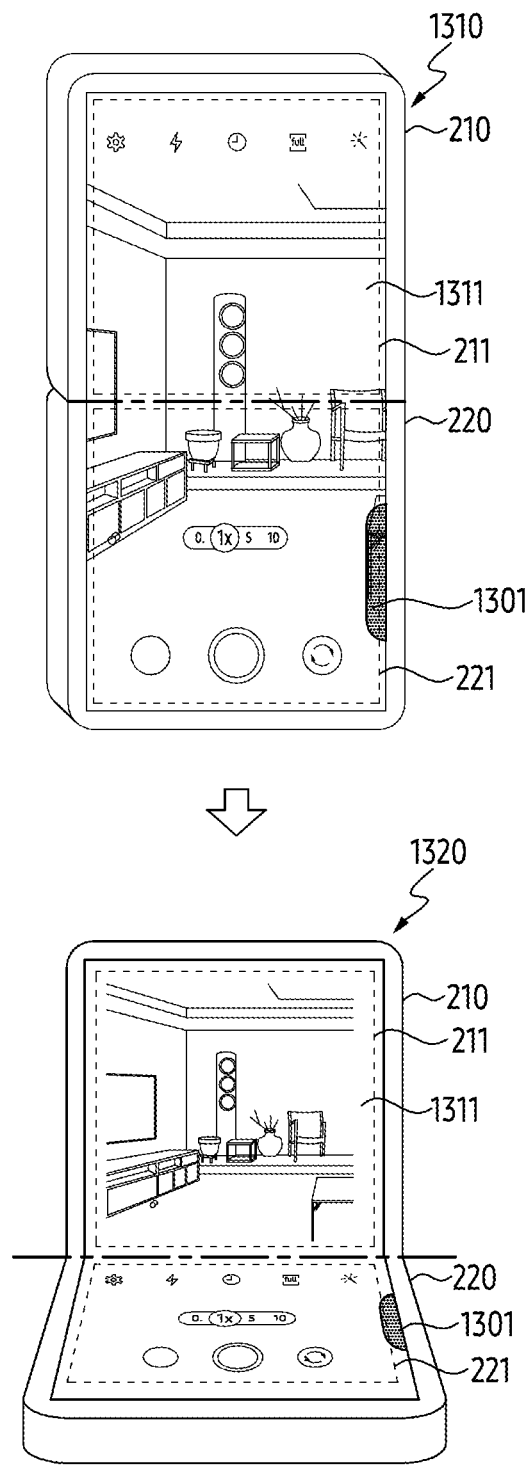
FIG. 13 is a diagram illustrating an example of an operation of an electronic device according to various embodiments.

FIG. 13 is a diagram illustrating an example of an operation of an electronic device according to various embodiments.

Referring to FIG. 13, in a state 1310, a processor 410 may display a first user interface 1311 related to a first application within a first display area 211 and a second display area 221. The processor 410 may identify that a state of an electronic device 400 is in a second state based on identifying that a first direction which the first display area 211 faces toward and a second direction which the second display area 221 faces toward are parallel.

According to an embodiment, while an object 1301 is displayed on a portion of an edge of the first display area 211 as in the state 610 of FIG. 6, the processor 410 may identify an input for changing a position where the object 1301 is displayed from the portion of the edge of the first display area 211 to a portion of an edge of the second display area 221. The processor 410 may display the object 1301 on the portion of the edge of the second display area as in the state 1310 based on the input.

For example, the processor 410 may display the object 1301 on the portion of the edge of the second display area in response to dragging the displayed object 1301 on the portion of the edge of the first display area 211 and identifying an input for dropping the object 1301 on the portion of the edge of the second display area.

According to an embodiment, the processor 410 may identify whether the state of the electronic device 400 is changed from the second state to the first state while the object 1301 is displayed on the portion of the edge of the second display area 221 based on an input for changing the position where the object 1301 is displayed from the portion of the edge of the first display area 211 to the portion of the edge of the second display area 221.

In a state 1320, the processor 410 may maintain the position where the object 1301 is displayed as the portion of the edge of the second display area 221 in response to identifying that the state of the electronic device 400 is changed from the second state to the first state.

According to an embodiment, after the state of the electronic device 400 is in the second state and the object 1301 is displayed on the portion of the edge of the second display area 221, the processor 410 may maintain the position of the object 1301 as the portion of the edge of the second display area 221 even when the state of the electronic device 400 is changed from the second state to the first state.

Figure 14:
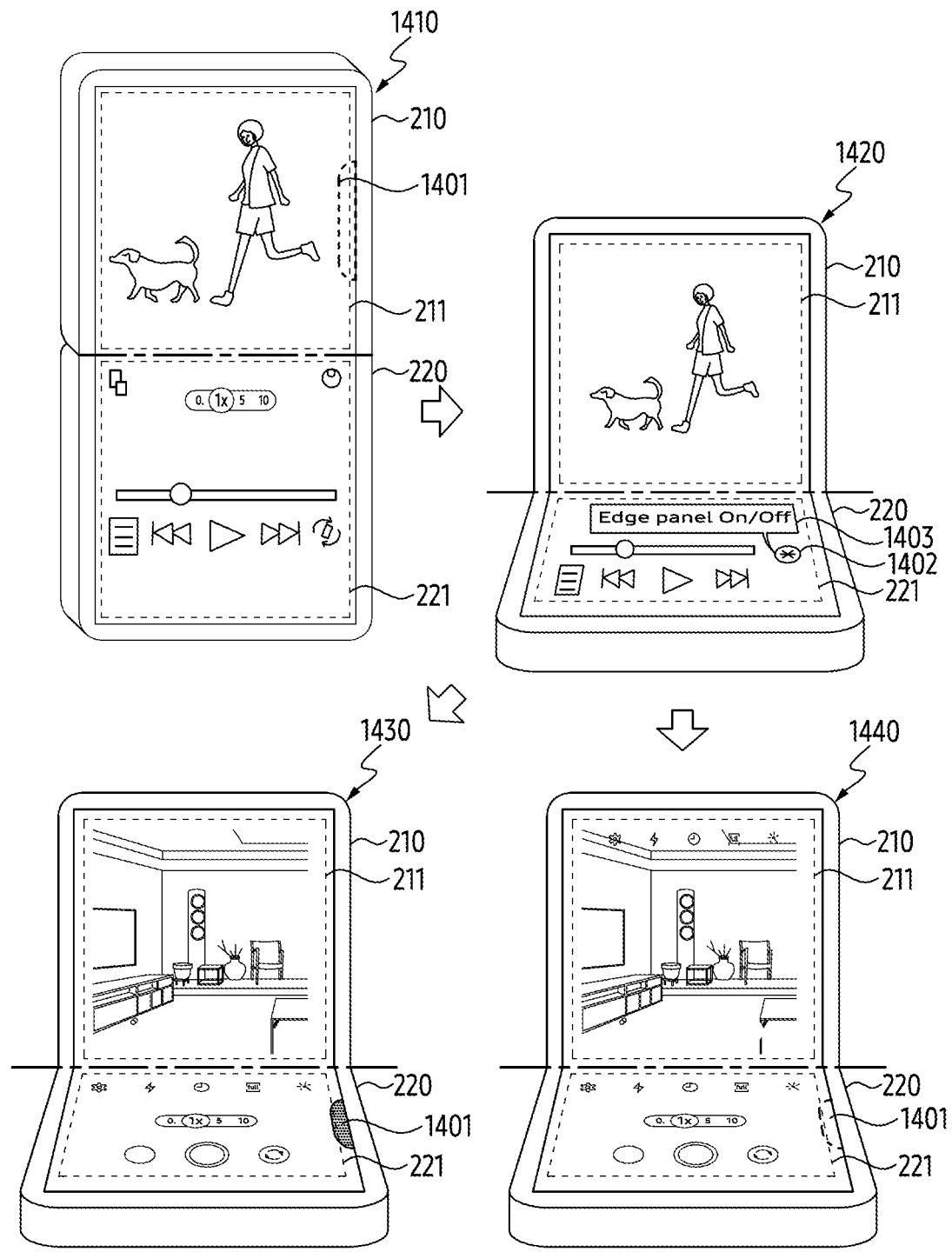
FIG. 14 is a diagram illustrating an example of an operation of an electronic device according to various embodiments.

FIG. 14 is a diagram illustrating an example of an operation of an electronic device according to various embodiments.

Referring to FIG. 14, in a state 1410, a processor 410 may display a first user interface related to a first application within a first display area 211 and a second display area 221. The processor 410 may identify that a state of an electronic device 400 is in a second state based on identifying that a first direction which the first display area 211 faces toward and a second direction which the second display area 221 faces toward are parallel.

According to an embodiment, the processor 410 may identify an input for removing an object 1401 while the object 1401 is displayed on a portion of an edge of the first display area 211 as illustrated in the state 610 of FIG. 6. The processor 410 may remove the object 1401 as in the state 1410, based on the input.

According to an embodiment, the processor 410 may identify whether the state of the electronic device 400 is changed from the second state to the first state while the object 1401 is removed based on a user input for removing the object 1401.

In a state 1420, the processor 410 may display an element 1402 related to the object 1401 superimposed on the first user interface within the second display area 221 in response to identifying that the state of the electronic device 400 is changed from the second state to the first state. For example, the processor 410 may display a pop-up window 1403 together with the element 1402. The pop-up window 1403 may be displayed to notify that the element 1402 is used to change whether the object 1401 is displayed. The processor 410 may change whether the object 1401 is displayed based on a user input to the element 1402.

In a state 1430, the processor 410 may display the object 1401 on a portion of the edge of the second display area 221 extending from the edge of the first display area 211 based on a first input to the element 1402 related to the object 1401. For example, the first input may refer, for example, to an input for setting the object 1401 to be displayed. The processor 410 may identify (or receive) the first input to the element 1402. The processor 410 may display the object 1401 on a portion of the edge of the second display area 221 extending from the edge of the first display area 211 based on the first input.

According to an embodiment, the processor 410 may display the object 1401 on a portion of the edge of the second display area 221 and remove the element 1402, based on the first input. For example, the processor 410 may stop displaying the element 1402 based on the first input.

In a state 1440, the processor 410 may remove the element 1402 displayed as superimposed on the first user interface within the second display area 221 based on a second input to the element 1402 related to the object 1401. For example, the second input may refer, for example, to an input for setting the object 1401 not to be displayed. The processor 410 may identify (or receive) the second input to the element 1402. The processor 410 may remove the element 1402 without displaying the object 1401 based on the second input.

According to an embodiment, the processor 410 may remove the element 1402 displayed as superimposed on the first user interface without displaying the object 1401 based on the second input. For example, the processor 410 may stop displaying the element 1402 based on the second input.

Figure 15:
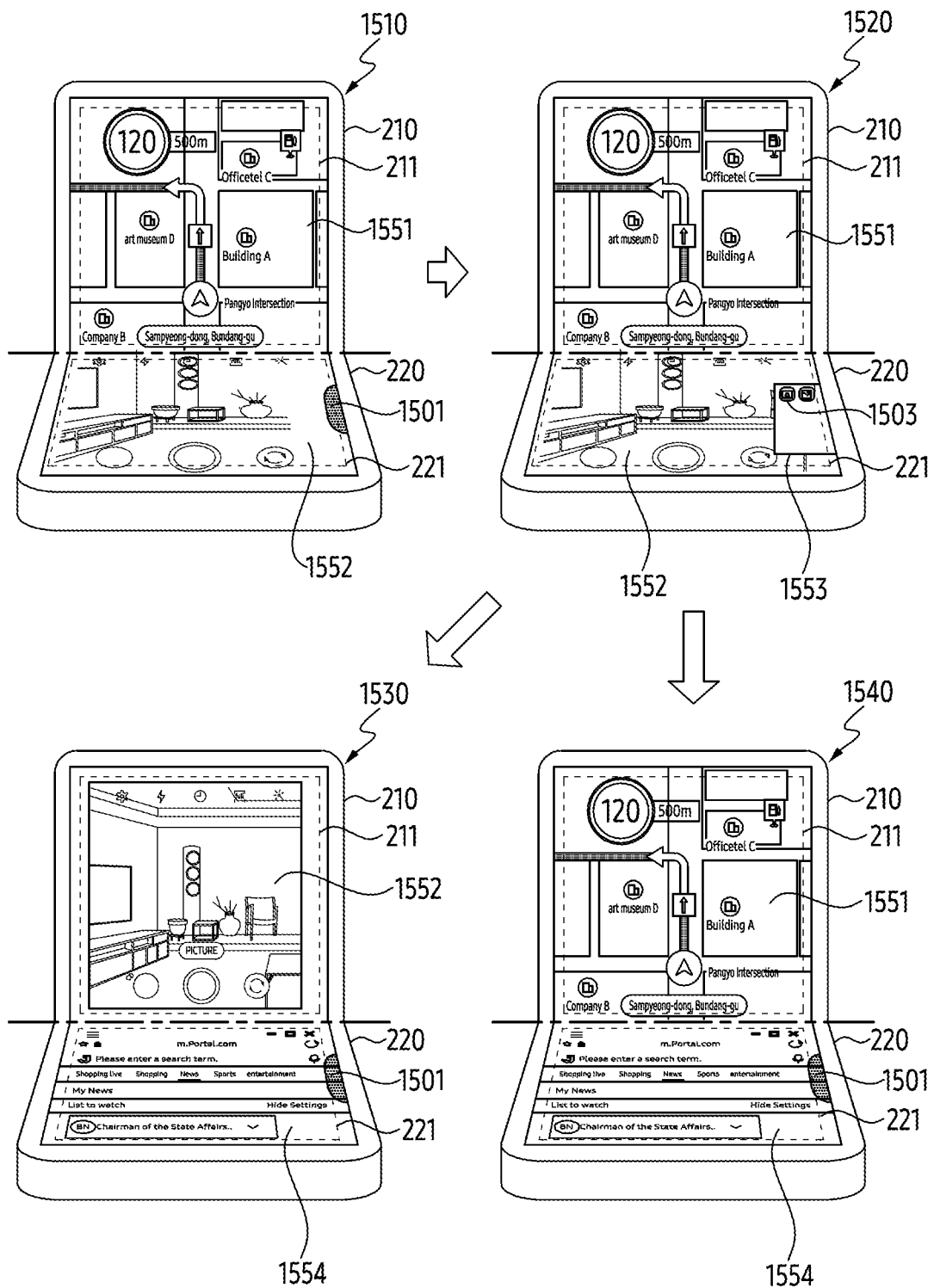
FIG. 15 is a diagram illustrating an example of an operation of an electronic device according to various embodiments.

FIG. 15 is a diagram illustrating an example of an operation of an electronic device according to various embodiments.

Referring to FIG. 15, in a state 1510, a state of an electronic device 400 may be in a first state. For example, a processor 410 may identify that the state of the electronic device 400 is in the first state based on identifying that an angle between a first direction which a first display area 211 faces toward and a second direction which a second display area 221 faces toward is within a reference range. In the state 1510, the electronic device 400 may operate in a reference posture. For example, the processor 410 may identify that the electronic device 400 operates in the reference posture based on identifying that an angle between the second direction which the second display area 221 faces toward and a reference direction is within a predetermined range. For example, the processor 410 may identify that the electronic device 400 operates in the reference posture based on identifying that the electronic device 400 is mounted by an external object (e.g., a part of the user's body).

According to an embodiment, the processor 410 may display a first user interface 1551 related to a first application (e.g., a navigation application) within the first display area 211. The processor 410 may display a second user interface 1552 related to a second application (e.g., a camera application) within the second display area 221.

In the first state, the processor 410 may display an object 1501 used to display a third user application 1553 as superimposed on the second user interface 1552 displayed on the second display area 221. For example, the processor 410 may display the object 1501 on a portion of an edge of the second display area 221.

In a state 1520, the processor 410 may identify a first user input to the object 1501. The processor 410 may display the third user interface 1553 in response to the first user input. For example, the third user interface 1553 may include at least one executable object corresponding to at least one application, respectively. For example, the third user interface 1553 may include an executable object 1503 related to a third application (e.g., an Internet application). The processor 410 may identify a second user input to the executable object 1503. For example, the second user input may drag the executable object 1513, and may include an input which is dropped within the second display.

According to an embodiment, the processor 410 may identify an activated application based on the second user input. The processor 410 may execute the third application together with the activated application among the first application and the second application.

In a state 1530, the processor 410 may identify that the second application among the first application and the second application is activated based on the second user input. The processor 410 may display the second user interface 1552 related to the second application on the first display area 211 and may display a fourth user interface 1554 related to the third application on the second display area 221. For example, the processor 410 may change a display area where the second user interface 1552 is displayed from the second display area 221 to the first display area 211 and may display the fourth user interface 1554 within the second display area 221 based on the second user input.

In a state 1540, the processor 410 may identify that the first application among the first application and the second application is activated based on the second user input. The processor 410 may display the first user interface 1551 related to the first application on the first display area 211 and may display the fourth user interface 1554 related to the third application on the second display area 221. For example, the processor 410 may maintain a display area where the first user interface 1551 is displayed as the first display area 211 and may display the fourth user interface 1554 within the second display area 221, based on the second user input.

According to an example embodiment, an electronic device may comprise: a flexible display including a first display area and a second display area extending from the first display area divided based on a folding axis, at least one sensor, and a processor operatively coupled to the flexible display and the at least one sensor. The processor may be configured to: control the display to display an object at least partially superimposed on a first user interface displayed on the first display area and the second display area, on a portion of an edge of the first display area perpendicular to the folding axis, while a state of the electronic device is a second state, wherein a first state is a state in which an angle between a first direction which the first display area faces and a second direction which the second display area faces is within a reference range, and the second state is a state in which the first direction and the second direction are parallel. The object may be used for displaying a second user interface. The processor may be configured to identify that the state of the electronic device is changed from the second state to the first state while the object (is displayed on the portion of the edge of the first display area. The processor may be configured to control the display to display the object on a portion of an edge of the second display area extending from the edge of the first display area, in response to identifying that the state of the electronic device is changed from the second state to the first state.

According to an example embodiment, the processor may be configured to identify (or receive) a first input to the object displayed on the portion of the edge of the second display area. The processor may be configured to control the display to display the second user interface at least partially superimposed on the first user interface on the second display area, based on the first input.

According to an example embodiment, the first user interface may be related to a first application. The second user interface may include at least one executable object corresponding to at least one application, respectively. The processor may be configured to identify (or receive) a second input to a first executable object of the at least one executable object included in the second user interface displayed on the second display area. Based on the second input, the processor may be configured to control the display to display the first user interface on the first display area and display a third user interface related to a second application corresponding to the first executable object on the second display area.

According to an example embodiment, the processor may be configured to control the display to display the object superimposed on the third user interface, on the portion of the edge of the second display area, while the third user interface is displayed on the second display area.

According to an example embodiment, the processor may be configured to identify (or confirm) that the state of the electronic device is changed from the first state to the second state, while the first user interface is displayed on the first display area and the third user interface is displayed on the second display area. The processor may be configured to control the display to display the object on the portion of the edge of the first display area, in response to identifying that the state of the electronic device is changed from the first state to the second state.

According to an example embodiment, the processor may be configured to control the display to display a first area of the first user interface, for displaying content on the first display area and display a second area of the first user interface, for controlling the content on the second display area 221, in response to identifying (or confirming) that the state of the electronic device is changed from the second state to the first state.

According to an example embodiment, the processor may be configured to identify an event related to the electronic device. The processor may be configured to control the display to display a notification message for representing the identified event superimposed on a portion of the first user interface displayed on the second display area.

According to an example embodiment, the processor may be configured to identify, using the at least one sensor, that an angle between the first direction and the second direction is changed within a reference range. The processor may be configured to identify the state of the electronic device is changed from the second state to the first state, in response to identifying that the angle between the first direction and the second direction is changed within the reference range.

According to an example embodiment, the processor may be configured to control the display to display the object on a portion of another edge of the first display area, while the electronic device in the second state operates in a posture distinct from the reference posture. The processor may be configured to identify that the state of the electronic device is changed from the second state to the first state, while the object is displayed on the portion of the another edge of the first display area. The processor may be configured to control the display to display the object on another portion of the another edge of the first display area, in response to identifying that the state of the electronic device is changed from the second state to the first state.

According to an example embodiment, the first user interface may be related to the first application. The processor may be configured to identify a first input to a button for displaying at least one application executed in background and an application executed recently, displayed on the second display area, based on the state of the electronic device being changed from the second state to the first state. The processor may be configured to control the display to display a plurality of executable objects respectively corresponding to a plurality of applications on the second display area, in response to the input to the button. The processor may be configured to control the display to display a third user interface related to a second application corresponding to the first executable objects on the second display area, in response to identifying a second input to a first executable object among the plurality of executable objects.

According to an example embodiment, the processor may be configured to identify an input for changing position which the object displayed on, from the portion of the edge of the first display area to the portion of the edge of the second display area, while the object is displayed on the portion of the edge of the first display area. The processor 410 may be configured to identify that the state of the electronic device is changed from the second state to the first state, while the object is displayed on the portion of the edge of the second display area based on the input. The processor may be configured to maintain position which the object displayed on, as the portion of the edge of the second display area, in response to identifying that the state of the electronic device is changed from the second state to the first state.

According to an example embodiment, the processor may be configured to identify an input for removing the object displayed on the portion of the edge of the first display area. The processor may be configured to identify that the state of the electronic device is changed from the second state to the first state, while the object is removed based on the input. The processor may be configured to control the display to display an element related to the object, superimposed on the first user interface on the second display area, in response to identifying that the state of the electronic device is changed from the second state to the first state.

According to an example embodiment, the processor may be configured to control the display to display, based on first input to the element related to the object, the object on the portion of the edge of the second display area extending from the edge of the first display area.

According to an example embodiment, the processor may be configured to remove, based on second input to the element related to the object, the element displayed superimposed on the first user interface (on the second display area.

According to an example embodiment, a method of operating an electronic device may comprise: while a state of the electronic device is a second state, wherein a first state is a state in which an angle between a first direction which the first display area of a flexible display of the electronic device faces, and a second direction which the second display area of the flexible display extending from the first display area faces is within a reference range, and the second state is a state in which the first direction and the second direction are parallel, displaying an object at least partially superimposed on a first user interface displayed on the first display area and the second display area, on a portion of an edge of the first display area perpendicular to the folding axis, wherein the object is used for displaying a second user interface. The method may comprise while the object is displayed on the portion of the edge of the first display area, identifying that the state of the electronic device is changed to the first state from the second state. The method may comprise displaying the object on a portion of an edge of the second display area extending from the edge of the first display area, in response to identifying that the state of the electronic device is changed to the first state from the second state.

According to an example embodiment, the method may comprise identifying a first input to the object displayed on the portion of the edge of the second display area. The method may comprise displaying the second user interface at least partially superimposed on the first user interface on the second display area, based on the first input.

According to an example embodiment, wherein the first user interface may be related to a first application, wherein the second user interface may include at least one executable object corresponding to at least one application respectively, wherein the method may comprise identifying a second input to a first executable object of the at least one executable object included in the second user interface displayed on the second display area. The method may comprise displaying the first user interface on the first display area and displaying a third user interface related to second application corresponding to the first executable object on the second display area, based on the second input.

According to an example embodiment, the method may comprise displaying the object, superimposed on the third user interface, on the portion of the edge of the second display area, while the third user interface is displayed on the second display area.

According to an example embodiment, the method may comprise identifying that the state of the electronic device is changed from the first state to the second state, while the first user interface is displayed on the first display area and the third user interface is displayed on the second display area. The method may comprise displaying the object on the portion of the edge of the first display area, in response to identifying that the state of the electronic device is changed from the first state to the second state.

According to an example embodiment, the method may comprise displaying a first area of the first user interface, for displaying content on the first display area and display a second area of the first user interface, for controlling the content on the second display area, in response to identifying that the state of the electronic device is changed from the second state to the first state.

The electronic device according to various embodiments disclosed in the present disclosure may be various types of devices. The electronic device may include, for example, a portable communication device (e.g., a smartphone), a computer device, a portable multimedia device, a portable medical device, a camera, a wearable device, a home appliance, or the like. The electronic device according to an embodiment of the present disclosure is not limited to the above-described devices.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this disclosure, each of the phrases such as "A or B", "at least one of A and B", "at least one of A, B and C", "at least one of A, B, or C", and "at least one of A, B, or C" may include any one of the phrases together, or all possible combinations thereof. Terms such as "first", "second", or "second", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", some of the components can be connected directly (e.g., wired), wirelessly, or through a third component.

The term "module" used in various embodiments of the present disclosure may include a unit implemented in hardware, software, or firmware, or any combination thereof, and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

Various embodiments of the present disclosure may be implemented as software (e.g., a program) including one or more instructions stored in a storage medium (or external memory) readable by a device (e.g., wearable device 100). For example, a processor (e.g., a processor) of a device (e.g., wearable device 100) may call and execute at least one of the one or more instructions stored from a storage medium. This makes it possible for the device to operate to perform at least one function according to at least one command called. The one or more instructions may include code generated by a compiler or code that may be executed by an interpreter. The device-readable storage medium may be provided in the form of a non-transitory storage medium. Here, the 'non-transitory' storage medium is a device that is tangible and may not include a signal (e.g., electromagnetic wave), and the term does not distinguish between a case where data is semi-permanently stored and a case where it is temporarily stored.

According to an embodiment, a method according to various embodiments disclosed in the present disclosure may be provided by being included in a computer program product. The computer program products may be traded between sellers and buyers as products. The computer program products may be distributed in the form of device-readable storage media (e.g., compact disc read only memory (CD-ROM), or distributed (e.g., downloaded or uploaded) directly or online through an application store (e.g., Play Store™) or between two user devices (e.g., smartphones). In the case of online distribution, at least some of the computer program products may be temporarily stored or temporarily created on a device-readable storage medium such as a manufacturer's server, a server in an application store, or a memory in a relay server.

According to various embodiments, each of the above-described components (e.g., a module or a program) may include a single object or a plurality of objects, and some of the plurality of objects may be separated and disposed in other components. According to various embodiments, one or more components or operations of the above-described corresponding components may be omitted, or one or more other components or operations may be added. Alternatively, or additionally, a plurality of components (e.g., modules or programs) may be integrated into one component. In this case, the integrated component may perform one or more functions of each of the components in the same or similar manner as those performed by the corresponding component among the plurality of components before the integration. According to various embodiments, operations performed by a module, a program, or other components may be executed sequentially, in parallel, repeatedly, or heuristic, performed in a different order, omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a flexible display comprising display area that includes first display area and second display area extending from the first display area, wherein the display area is divided into the first display area and the second display area, based on a folding axis;
at least one sensor;
at least one processor comprising processing circuitry; and
memory, storing instructions, comprising one or more storage media,
wherein the instructions, when executed by the at least one processor, cause the electronic device to:
in an unfolded state of the electronic device where a first user interface is displayed on the first display area and the second display area, control the flexible display to display an object on the first user interface on the first display area, wherein the object is displayed on a portion of an edge of the first display area perpendicular to the folding axis, wherein the object is usable for displaying a second user interface,
while the object is displayed on the portion of the edge of the first display area, identify that the state of the electronic device is changed to a partially-folded state from the unfolded state, and
based on the identification, change a display position of the object from the portion of the edge of the first display area to a portion of an edge of the second display area extending from the edge of the first display area, wherein the edge of the second display area is perpendicular to the folding axis.

2. The electronic device of claim 1, wherein the instructions, when executed by the at least one processor, cause the electronic device to:
- identify a first input to the object displayed on the portion of the edge of the second display area, and
- based on the first input, control the display to display the second user interface at least partially superimposed on the first user interface on the second display area.

3. The electronic device of claim 2, wherein the first user interface is related to a first application,
- wherein the second user interface includes at least one executable object corresponding to at least one application respectively, and
- wherein the instructions, when executed by the at least one processor, cause the electronic device to:
- identify a second input to a first executable object of the at least one executable object included in the second user interface displayed on the second display area, and
- based on the second input, display the first user interface on the first display area and display a third user interface related to second application corresponding to the first executable object on the second display area.

4. The electronic device of claim 3, wherein the instructions, when executed by the at least one processor, cause the electronic device to control the display to display the object, superimposed on the third user interface, on the portion of the edge of the second display area while the third user interface is displayed on the second display area.

5. The electronic device of claim 4, wherein the instructions, when executed by the at least one processor, cause the electronic device to
- while the first user interface is displayed on the first display area and the third user interface is displayed on the second display area, identify that the state of the electronic device is changed from the partially-folded state to the unfolded state, and
- in response to identifying that the state of the electronic device is changed from the partially-folded state to the unfolded state, display the object on the portion of the edge of the first display area.

6. The electronic device of claim 1, wherein the instructions, when executed by the at least one processor, cause the electronic device to control the flexible display to display a first area of the first user interface, for displaying content on the first display area and display a second area of the first user interface, for controlling the content on the second display area, in response to identifying that the state of the electronic device is changed from the unfolded state to the partially-folded state.

7. The electronic device of claim 1, wherein the instructions, when executed by the at least one processor, cause the electronic device to:
- identify an event related to the electronic device, and
- control the flexible display to display a notification message for representing the identified event superimposed on a portion of the first user interface displayed on the second display area.

8. The electronic device of claim 1, wherein the partially-folded state is a state in which an angle between a first direction which the first display area faces and a second direction which the second display area faces is within a reference range,
- wherein the unfolded state is a state in which the first direction and the second direction are parallel, and
- wherein the instructions, when executed by the at least one processor, cause the electronic device to:
- identify, using the at least one sensor, that an angle between the first direction and the second direction is changed within a reference range, and
- in response to identifying that the angle between the first direction and the second direction is changed within the reference range, identify the state of the electronic device is changed to the partially-folded state from the unfolded state.

9. The electronic device of claim 1, wherein the instructions, when executed by the at least one processor, cause the electronic device to:
- while the electronic device in the unfolded state operates in a posture distinct from a reference posture, control the flexible display to display the object on a portion of another edge of the first display area,
- while the object is displayed on the portion of the another edge of the first display area, identify that the state of the electronic device is changed from the unfolded state to the partially-folded state, and
- in response to identifying that the state of the electronic device is changed from the unfolded state to the partially-folded state, display the object on another portion of the other edge of the first display area.

10. The electronic device of claim 1, wherein the first user interface is related to first application, and
- wherein the instructions, when executed by the at least one processor, cause the electronic device to:
- based on the state of the electronic device being changed from the unfolded state to the partially-folded state, identify a first input to a button for displaying at least one application executed in background and an application executed within a specified time, displayed on the second display area
- in response to the input to the button, control the flexible display to display a plurality of executable objects respectively corresponding to a plurality of applications on the second display area,
- in response to identifying a second input to a first executable object among the plurality of executable objects, control the flexible display to display a third user interface related to a second application corresponding to the first executable object on the second display area.

11. The electronic device of claim 1, wherein the instructions, when executed by the at least one processor, cause the electronic device to:
- while the object is displayed on the portion of the edge of the first display area, identify an input for changing position at which the object displayed, from the portion of the edge of the first display area to the portion of the edge of the second display area,
- while the object is displayed on the portion of the edge of the second display area based on the input, identify that the state of the electronic device is changed from the unfolded state to the partially-folded state, and
- in response to identifying that the state of the electronic device is changed from the unfolded state to the partially-folded state, maintain a position at which the object is displayed, as the portion of the edge of the second display area.

12. The electronic device of claim 1, wherein the instructions, when executed by the at least one processor, cause the electronic device to:
- identify an input for removing the object displayed on the portion of the edge of the first display area,
- while the object is removed based on the input, identify that the state of the electronic device is changed from the unfolded state to the first partially-folded state, and in response to identifying that the state of the electronic device is changed from the unfolded state to the partially-folded state, display an element related to the object, superimposed on the first user interface on the second display area.

13. The electronic device of claim 12, wherein the instructions, when executed by the at least one processor, cause the electronic device to control the flexible display to display, based on the element related to the object, the object on the portion of the edge of the second display area extending from the edge of the first display area.

14. The electronic device of claim 13, wherein the instructions, when executed by the at least one processor, cause the electronic device to remove, based on second input to the element related to the object, the element displayed superimposed on the first user interface on the second display area.

15. A method of operating an electronic device, the method comprising:
controlling a flexible display comprising display area including first display area and second display area extending from the first display area and being divided into the first display area and the second display area, to display, in an unfolded state of the electronic device where a first user interface is displayed on the first display area and the second display area, an object on a first user interface on the first display area, wherein the object is displayed on a portion of an edge of the first display area perpendicular to the folding axis, wherein the object is usable for displaying a second user interface,
while the object is displayed on the portion of the edge of the first display area, identifying that the state of the electronic device is changed to a partially-folded state from the unfolded state, and
based on the identification, changing a display position of the object from the portion of the edge of the first display area to a portion of an edge of the second display area extending from the edge of the first display area, wherein the edge of the second display area is perpendicular to the folding axis.

16. The method of claim 15, further comprising:
identifying a first input to the object displayed on the portion of the edge of the second display area, and
based on the first input, displaying the second user interface at least partially superimposed on the first user interface on the second display area.

17. The method of claim 16, wherein the first user interface is related to a first application,
wherein the second user interface includes at least one executable object corresponding to at least one application respectively, and
wherein the method further comprises:
identifying a second input to a first executable object of the at least one executable object included in the second user interface displayed on the second display area, and
based on the second input, displaying the first user interface on the first display area and displaying a third user interface related to second application corresponding to the first executable object.

18. The method of claim 17, further comprising:
displaying the object, superimposed on the third user interface, on the portion of the edge of the second display area while the third user interface is displayed on the second display area.

19. The method of claim 17, further comprising:
while the first user interface is displayed on the first display area and the third user interface is displayed on the second display area, identifying that the state of the electronic device is changed from the partially-folded state to the unfolded state, and
in response to identifying that the state of the electronic device is changed from the partially-folded state to the unfolded state, displaying the object on the portion of the edge of the first display area.

20. The method of claim 15, further comprising:
displaying a first area of the first user interface, for displaying content on the first display area and display a second area of the first user interface, for controlling the content on the second display area, in response to identifying that the state of the electronic device is changed from the unfolded state to the partially-folded state.

* * * * *